United States Patent [19]

Nagae

[11] Patent Number: 6,006,248
[45] Date of Patent: Dec. 21, 1999

[54] JOB APPLICATION DISTRIBUTING SYSTEM AMONG A PLURALITY OF COMPUTERS, JOB APPLICATION DISTRIBUTING METHOD AND RECORDING MEDIA IN WHICH JOB APPLICATION DISTRIBUTING PROGRAM IS RECORDED

[75] Inventor: Toshihide Nagae, Tokyo, Japan

[73] Assignee: NEC Corporation, Tokyo, Japan

[21] Appl. No.: 08/893,666

[22] Filed: Jul. 11, 1997

[30] Foreign Application Priority Data

Jul. 12, 1996 [JP] Japan ................................ 8-202864

[51] Int. Cl.⁶ ...................................................... G06F 9/00
[52] U.S. Cl. ........................................... 709/105; 709/202
[58] Field of Search ........................ 395/200.43, 200.44, 395/200.45, 200.32–200.35, 200.55–200.57, 674, 675; 709/202

[56] References Cited

U.S. PATENT DOCUMENTS

| | | | |
|---|---|---|---|
| 5,774,660 | 6/1998 | Brendel et al. | 395/200.31 |
| 5,774,668 | 6/1998 | Choquir et al. | 395/200.53 |

FOREIGN PATENT DOCUMENTS

| | | |
|---|---|---|
| 5-101019 | 4/1993 | Japan . |
| 5-151177 | 6/1993 | Japan . |

Primary Examiner—Zarni Maung
Assistant Examiner—David M. Ovedovitz
Attorney, Agent, or Firm—Young & Thompson

[57] ABSTRACT

Plural computers share an external storage device, each of the computers include a main computer load information collecting device for collecting load information associated with at least one source of a main computer at each constant time; main computer load information storage device for storing in the external storage device the collected load information; other computer load information reference devices for deriving the load information of another computer group from the external storage device; computer specifying device for specifying the computer having an allowance of the load in accordance with the load information of the main computer collected by the main computer load information collecting device and the load information of the other computer group derived by the other computer load information reference device; and objective computer deciding device for, when an executable job application in any one of the plural computers is loaded into the main computer, deciding the computer specified by the computer specifying device as an objective computer to which the job application is moved.

21 Claims, 21 Drawing Sheets

Fig. 16
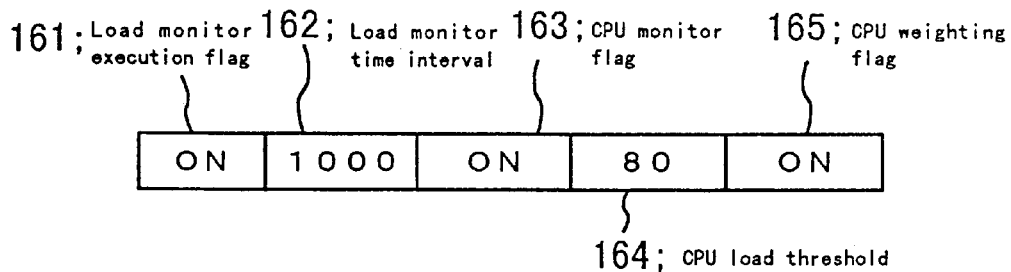
Fig. 17
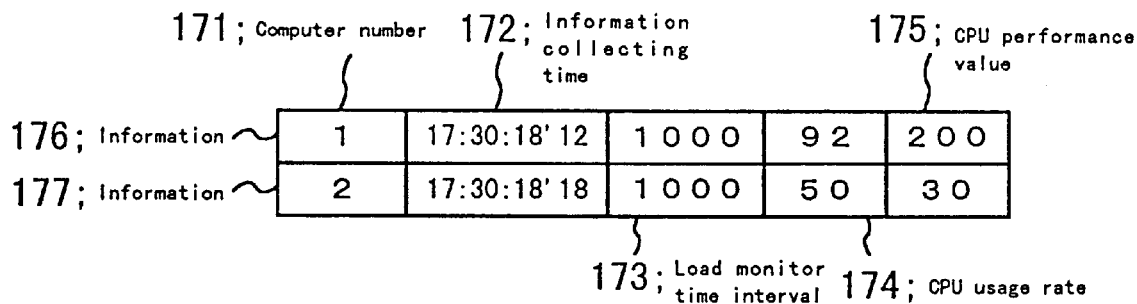
Fig. 18
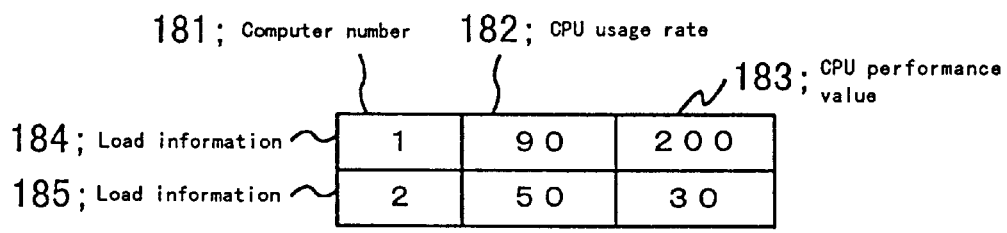
Fig. 19
| Computer number | Rate of idle CPU | Value resulted from multiplication by CPU performance value | Judge result |
|---|---|---|---|
| 1 | 100-90=10% | 100*200=2000 | Large |
| 2 | 100-50=50% | 50*30=1500 | Small |

JOB APPLICATION DISTRIBUTING SYSTEM AMONG A PLURALITY OF COMPUTERS, JOB APPLICATION DISTRIBUTING METHOD AND RECORDING MEDIA IN WHICH JOB APPLICATION DISTRIBUTING PROGRAM IS RECORDED

BACKGROUND OF THE INVENTION (i) Field of the Invention

The present invention relates to a system for distributing a job and a transaction (hereinafter a job application) among a plurality of computers which monitors a load of each computer system and determines to move a job application loaded to each computer system to other computer system and a job application distributing method and recording media in which a job application distributing program is recorded, so as to distribute the load among a plurality of computers which share a common storage device.

(ii) Description of the Related Art

As a technique disclosed in Japanese Patent Laid-Open No. 5-101019/1993, in three or more distributing computer systems which are connected to one another via a communication channel, each computer judges whether or not a load of a main computer exceeds a limit value in response to a job execution requirement to the main computer. When the load exceeds the limit value, the job which receives the execution requirement is transmitted to other computer by the use of load information transmitting/receiving means, and thus the load of each computer is adjusted.

In addition, as the technique disclosed in Japanese Patent Laid-Open No. 5-151177/1993, a usage rate of a CPU of each computer system is monitored by a load control computer system. The job is moved to the computer having a lower CPU load, and thus the load of each computer is adjusted.

However, in these conventional techniques, in order to investigate load information of each computer in response to the job execution requirement or to obtain the load information of each computer from a particular monitor computer, a communication processing must be performed. Accordingly, specifically under conditions that many job execution requirements are instructed, disadvantageously, an overhead associated with the communication processing deteriorates a performance of the computer system and the performance for load monitor processing.

Furthermore, the job is moved to other computer in accordance with the load of the main computer alone. Even if a load difference between the main computer and other computer is small, the job is moved to the computer having the lower load. Thus, disadvantageously, the load of the computer to which the job is moved is inappropriately increased.

SUMMARY OF THE INVENTION

It is an object of the present invention to level a load among a plurality of computers and thereby to allow each computer to efficiently execute a job application.

It is another object of the present invention to store load information of each computer in a common file, to allow each computer to mutually monitor the load information and thereby to permit each computer to select an appropriate objective computer so that a performance of the objective computer may not deteriorated and the load of each computer may be leveled.

According to one aspect of the present invention, there is provided a job application distributing system among a plurality of computers sharing an external storage device, each of the plurality of computers which comprises main computer load information collecting means for collecting load information associated with at least one source of a main computer at every constant time; main computer load information storage means for storing, in the external storage device, the load information of the main computer collected by the main computer load information collecting means; other computer load information reference means for deriving the load information of an other computer group from the external storage device; computer specifying means for specifying the computer having an allowance of the load in accordance with the load information of the main computer collected by the main computer load information collecting means and the load information of the other computer group derived by the other computer load information reference means; and objective computer deciding means for, when an executable job application in any one of the plurality of computers is loaded into the main computer, deciding the computer specified by the computer specifying means as an objective computer to which the job application is moved.

According to another aspect of the present invention, there is provided the job application distributing system among a plurality of computers wherein the main computer load information collecting means collects a usage rate of a particular source of a main computer at each constant time; and the computer specifying means specifies a computer having the allowance of the load, when the usage rate of the source of the main computer exceeds a preset threshold and when in the other computer group is present a computer which has the lower usage rate of the source than the usage rate of the main computer.

According to still another aspect of the present invention, there is provided the job application distributing system among a plurality of computers, wherein the main computer load information collecting means collects a usage rate of a particular source of a main computer at each constant time; and the computer specifying means specifies a computer having the allowance of the load, when the usage rate of the source of the main computer exceeds a preset threshold and when in the other computer group is present a computer which has the lower usage rate of the source than a value which is determined independently of the main computer.

According to a further aspect of the present invention, there is provided the job application distributing system among a plurality of computers, wherein the main computer load information collecting means collects a usage rate of a particular source of a main computer at each constant time; the computer specifying means decreases a job application processing rate which is a rate of the job application executed in the main computer in a job application group loaded into the main computer when the usage rate of the source of the main computer exceeds a preset threshold and when in the other computer group is present the computer which has the lower usage rate of the source than the usage rate of the main computer, the computer specifying means increases the job application processing rate of the main computer when the load of the main computer is higher than that of the other computer group; and the objective computer deciding means decides to execute the corresponding number of job application to the job application processing rate in the main computer and to move the remaining job application to the other computer with reference to the job application processing rate of the main computer changed by the computer specifying means when the executable job application in any one of the plurality of computers is loaded to the main computer.

According to a further aspect of the present invention, there is provided the job application distributing system among a plurality of computers, wherein the main computer load information collecting means collects a CPU usage rate of the main computer at each constant time; and the computer specifying means multiplies a CPU idle time by a CPU performance value in each of the plurality of computers when the CPU usage rate of the main computer exceeds a preset threshold, the computer specifying means specifies the computer having the largest multiplied value as the computer having the allowance of the load.

According to a further aspect of the present invention, there is provided the job application distributing system among a plurality of computers, wherein the computer specifying means specifies the computer as the computer having the allowance of the load when in other computer group is present the computer which has the lower load associated with any source than the load of the main computer.

According to a further aspect of the present invention, there is provided the job application distributing system among a plurality of computers, wherein the main computer load information collecting means collects a CPU usage rate of the job application which is executes on the main computer and has a high priority of the usage of a CPU and the CPU usage rate of the entire main computer at each constant time; and the computer specifying means judges whether or not the CPU usage rate associated with the high CPU usage priority job application exceeds the threshold when the CPU usage rate of the entire main computer exceeds the threshold, the computer specifying means allows the objective computer deciding means to decide a movement of any other job application than the high CPU usage priority job application to the other computer when the CPU usage rate does not exceed, the computer specifying means allows the objective computer deciding means to decide the movement of all the job application to the other computer when the CPU usage rate associated with the high CPU usage priority job application also exceeds the threshold.

According to a further aspect of the present invention, there is provided the job application distributing system among a plurality of computers, wherein the main computer load information collecting means collects the usage rate of a particular source of the main computer for a plurality of periods, each having a different length; the computer specifying means specifies the computer suitable for the execution of a short passing time job application when the usage rate of the short period source of the main computer exceeds a preset threshold of the usage rate of the short period source and when, for the short period, in the other computer group is present the computer which has the lower source usage rate than the usage rate of the main computer, the computer specifying means specifies the computer suitable for the execution of a long passing time job application when the usage rate of the long period source of the main computer exceeds a preset threshold of the usage rate of the long period source and when, for the long period, in the other computer group is present the computer which has the lower source usage rate than the usage rate of the main computer; and the objective computer deciding means decides to execute the job application in the suitable computer for executing the short passing time job application which is specified by the computer specifying means when the executable job application in any one of the plurality of computers is loaded to the main computer and when the passing time of the job application is short, the objective computer deciding means decides to execute the job application in the suitable computer for executing the long passing time job application which is specified by the computer specifying means when the passing time of the job application is long.

According to a further aspect of the present invention, there is provided a method of distributing a job application among a plurality of computers which comprises the steps of: collecting load information as to at least one source of a main computer at each constant time by each of a plurality of computers which share an external storage device; storing, by each computer, the load information of the main computer which is collected by the main computer load information collecting step in the external storage device; deriving the load information of an other computer group from the external storage device by each computer; specifying, by each computer, the computer which has an allowance of a load in accordance with the load information of the main computer collected by the main computer load information collecting step and the load information of the other computer group which is derived by the other computer load information reference means; and deciding, by each computer, the computer which is specified by the computer specifying step as an objective computer to which a job application is moved when an executable job application in any one of the plurality of computers is loaded to the main computer.

According to a further aspect of the present invention, there is provided the method of distributing a job application among a plurality of computers, wherein the main computer load information collecting step includes a step of collecting a usage rate of a particular source of the main computer at each constant time; and the computer specifying step includes a step of specifying a computer having the allowance of the load, when the usage rate of the source of the main computer exceeds a preset threshold and when in the other computer group is present a computer which has the lower usage rate of the source than the usage rate of the main computer.

According to a further aspect of the present invention, there is provided the method of distributing a job application among a plurality of computers, wherein the main computer load information collecting step includes a step of collecting a usage rate of a particular source of the main computer at each constant time; and the computer specifying step includes a step of specifying a computer having the allowance of the load, when the usage rate of the source of the main computer exceeds a preset threshold and when in the other computer group is present a computer which has the lower usage rate of the source than a value which is determined independently of the main computer.

According to a further aspect of the present invention, there is provided the method of distributing a job application among a plurality of computers, wherein the main computer load information collecting step includes a step of collecting a usage rate of a particular source of the main computer at each constant time; the computer specifying step includes a step of decreasing a job application processing rate which is a rate of the job application executed in the main computer in a job application group loaded into the main computer when the usage rate of the source of the main computer exceeds a preset threshold and when in the other computer group is present the computer which has the lower usage rate of the source than the.usage rate of the main computer, the computer specifying step includes a step of increasing the job application processing rate of the main computer when the load of the main computer is higher than that of the other computer group; and the objective computer deciding step includes a step of deciding to execute the corresponding number of job application to the job application processing rate in the main computer and to move the remaining job application to the other computer with reference to the job application processing rate of the main computer changed by the computer specifying means when the executable job application in any one of the plurality of computers is loaded to the main computer.

According to a further aspect of the present invention, there is provided the method of distributing a job application among a plurality of computers, wherein the main computer load information collecting step includes a step of collecting a CPU usage rate of the main computer at each constant time; and the computer specifying step includes a step of multiplying a CPU idle time by a CPU performance value in each of the plurality of computers when the CPU usage rate of the main computer exceeds a preset threshold, the computer specifying means specifies the computer having the largest multiplied value as the computer having the allowance of the load.

According to a further aspect of the present invention, there is provided the method of distributing a job application among a plurality of computers, wherein the computer specifying step includes a step of specifying the computer as the computer having the allowance of the load when in other computer group is present the computer which has the lower load associated with any source than the load of the main computer.

According to a further aspect of the present invention, there is provided the method of distributing a job application among a plurality of computers, wherein the main computer load information collecting step includes a step of collecting a CPU usage rate of the job application which is executes on the main computer and has a high priority of the usage of a CPU and the CPU usage rate of the entire main computer at each constant time; and the computer specifying step includes a step of judging whether or not the CPU usage rate associated with the high CPU usage priority job application exceeds the threshold when the CPU usage rate of the entire main computer exceeds the threshold, the computer specifying step includes a step of allowing the objective computer deciding means to decide a movement of any other job application than the high CPU usage priority job application to the other computer when the CPU usage rate does not exceed, the computer specifying step includes a step of allowing the objective computer deciding means to decide the movement of all the job application to the other computer when the CPU usage rate associated with the high CPU usage priority job application also exceeds the threshold.

According to a further aspect of the present invention, there is provided the method of distributing a job application among a plurality of computers, wherein the main computer load information collecting step includes a step of collecting the usage rate of a particular source of the main computer for a plurality of periods, each having a different length; the computer specifying step includes a step of specifying the computer suitable for the execution of a short passing time job application when the usage rate of the short period source of the main computer exceeds a preset threshold of the usage rate of the short period source and when, for the short period, in the other computer group is present the computer which has the lower source usage rate than the usage rate of the main computer, the computer specifying step includes a step of specifying the computer suitable for the execution of a long passing time job application when the usage rate of the long period source of the main computer exceeds a preset threshold of the usage rate of the long period source and when, for the long period, in the other computer group is present the computer which has the lower source usage rate than the usage rate of the main computer; and the objective computer deciding step includes a step of deciding to execute the job application in the suitable computer for executing the short passing time job application which is specified by the computer specifying means when the executable job application in any one of the plurality of computers is loaded to the main computer and when the passing time of the job application is short, the objective computer deciding step includes a step of deciding to execute the job application in the suitable computer for executing the long passing time job application which is specified by the computer specifying means when the passing time of the job application is long.

According to a further aspect of the present invention, there is provided recording media for recording a program which allows each of a plurality of computers sharing an external storage device to perform processing, the processing which comprises a main computer load information collecting processing for collecting load information associated with at least one source of a main computer at each constant time; a main computer load information storage processing for storing, in the external storage device, the load information of the main computer collected by the main computer load information collecting processing; an other computer load information reference processing for deriving the load information of an other computer group from the external storage device; a computer specifying processing for specifying the computer having an allowance of the load in accordance with the load information of the main computer collected by the main computer load information collecting processing and the load information of the other computer group derived by the other computer load information reference processing; and an objective computer deciding processing for, when an executable job application in any one of the plurality of computers is loaded into the main computer, deciding the computer specified by the computer specifying processing as an objective computer to which the job application is moved.

According to a further aspect of the present invention, there is provided the recording media, wherein the main computer load information collecting processing collects a usage rate of a particular source of a main computer at each constant time; and the computer specifying processing specifies a computer having the allowance of the load, when the usage rate of the source of the main computer exceeds a preset threshold and when in the other computer group is present a computer which has the lower usage rate of the source than the usage rate of the main computer.

According to a further aspect of the present invention, there is provided the recording media, wherein the main computer load information collecting processing collects a usage rate of a particular source of a main computer at each constant time; and the computer specifying processing specifies a computer having the allowance of the load, when the usage rate of the source of the main computer exceeds a preset threshold and when in the other computer group is present a computer which has the lower usage rate of the source than a value which is determined independently of the main computer.

According to a further aspect of the present invention, there is provided the recording media, wherein the main computer load information collecting processing collects a usage rate of a particular source of a main computer at each constant time; the computer specifying processing decreases a job application processing rate which is a rate of the job application executed in the main computer in a job application group loaded into the main computer when the usage rate of the source of the main computer exceeds a preset threshold and when in the other computer group is present the computer which has the lower usage rate of the source than the usage rate of the main computer, the computer specifying processing increases the job application processing rate of the main computer when the load of the main computer is higher than that of the other computer group; and the objective computer deciding processing decides to execute the corresponding number of job application to the job application processing rate in the main computer and to move the remaining job application to the other computer with reference to the job application processing rate of the main computer changed by the computer specifying processing when the executable job application in any one of the plurality of computers is loaded to the main computer.

According to a further aspect of the present invention, there is provided the recording media recording media, wherein the main computer load information collecting processing collects a CPU usage rate of the main computer at each constant time; and the computer specifying processing multiplies a CPU idle time by a CPU performance value in each of the plurality of computers when the CPU usage rate of the main computer exceeds a preset threshold, the computer specifying processing specifies the computer having the largest multiplied value as the computer having the allowance of the load.

According to a further aspect of the present invention, there is provided the recording media, wherein the computer specifying processing specifies the computer as the computer having the allowance of the load when in other computer group is present the computer which has the lower load associated with any source than the load of the main computer.

According to a further aspect of the present invention, there is provided the recording media, wherein the main computer load information collecting processing collects a CPU usage rate of the job application which is executes on the main computer and has a high priority of the usage of a CPU and the CPU usage rate of the entire main computer at each constant time; and the computer specifying processing judges whether or not the CPU usage rate associated with the high CPU usage priority job application exceeds the threshold when the CPU usage rate of the entire main computer exceeds the threshold, the computer specifying processing allows the objective computer deciding processing to decide a movement of any other job application than the high CPU usage priority job application to the other computer when the CPU usage rate does not exceed, the computer specifying processing allows the objective computer deciding processing to decide the movement of all the job application to the other computer when the CPU usage rate associated with the high CPU usage priority job application also exceeds the threshold.

According to a further aspect of the present invention, there is provided the recording media, wherein the main computer load information collecting processing collects the usage rate of a particular source of the main computer for a plurality of periods, each having a different length; the computer specifying processing specifies the computer suitable for the execution of a short passing time job application when the usage rate of the short period source of the main computer exceeds a preset threshold of the usage rate of the short period source and when, for the short period, in the other computer group is present the computer which has the lower source usage rate than the usage rate of the main computer, the computer specifying processing specifies the computer suitable for the execution of a long passing time job application when the usage rate of the long period source of the main computer exceeds a preset threshold of the usage rate of the long period source and when, for the long period, in the other computer group is present the computer which has the lower source usage rate than the usage rate of the main computer; and the objective computer deciding processing decides to execute the job application in the suitable computer for executing the short passing time job application which is specified by the computer specifying processing when the executable job application in any one of the plurality of computers is loaded to the main computer and when the passing time of the job application is short, the objective computer deciding processing decides to execute the job application in the suitable computer for executing the long passing time job application which is specified by the computer specifying processing when the passing time of the job application is long.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

FIG. 16 shows an example of the information within the job application execution computer deciding rule table 9 according to the fourth embodiment of the present invention.

FIG. 17 shows an example of the load monitor information stored in the external storage device 5 according to the fourth embodiment of the present invention.

FIG. 18 shows an example of the information within the load information table 7 according to the fourth embodiment of the present invention.

FIG. 19 shows, in a form of a table, a calculation example for deciding by means of the computer specifying means 8 according to the fourth embodiment of the present invention.

Here, it should be noted that like reference numerals represent like elements throughout the disclosure.

DETAILED DESCRIPTION OF THE PREFERRED EMBODIMENTS

Next, a first embodiment of the present invention will be described in detail with reference to the accompanying drawings.

Figure 1:
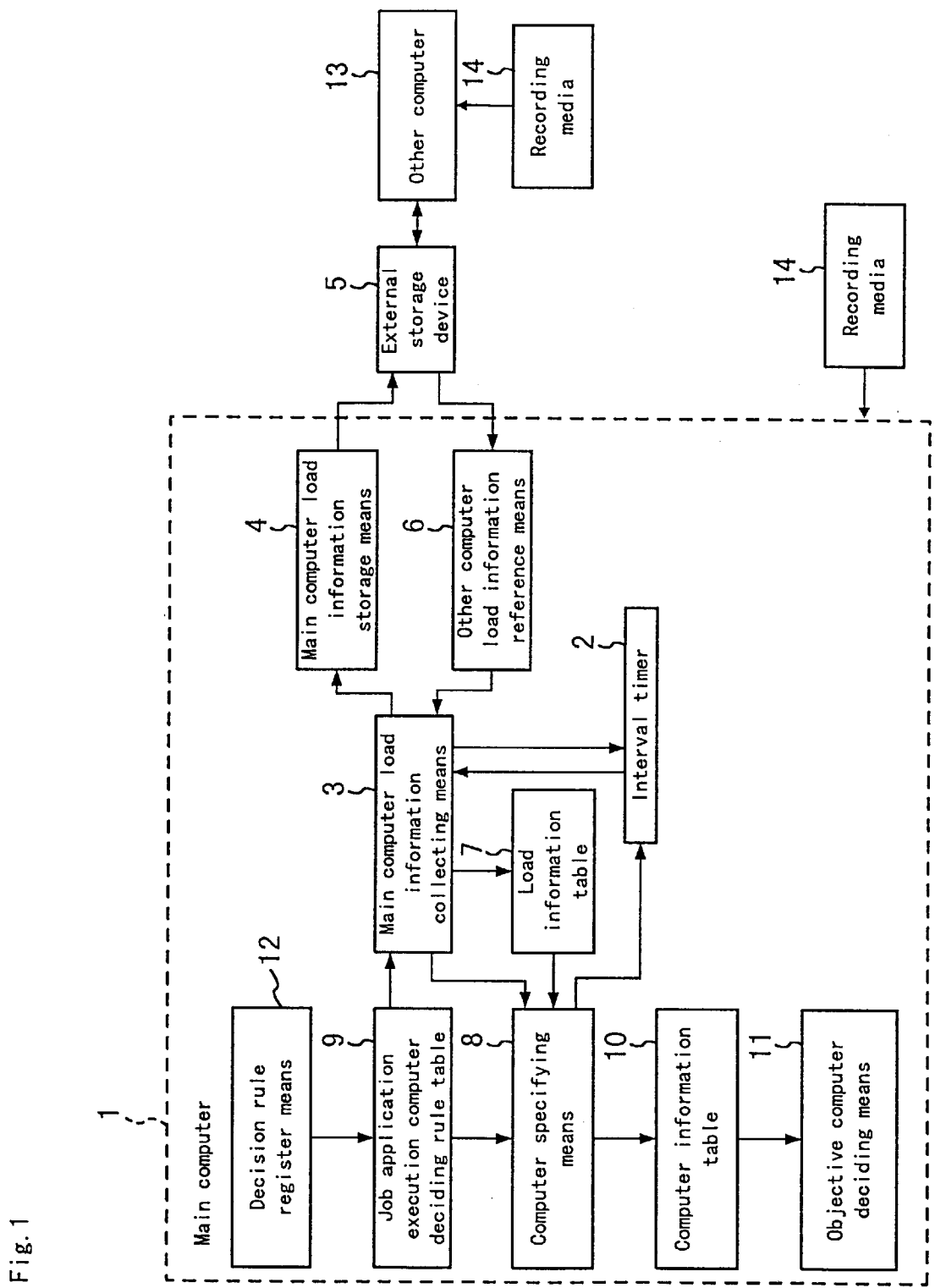
FIG. 1 is a block diagram showing a first embodiment to an eighth embodiment of the present invention.

Referring now to FIG. 1, the first embodiment of the present invention comprises a main computer 1 and other computer 13 which are operated by a program control and an external storage device 5 which are shared with them. In the first embodiment, although the case comprising two computers are described, the case comprising three or more computers are similarly applicable to the present invention.

The main computer 1 (and the other computer 13) include an interval timer 2 for providing an execution timing for a program at every constant time, a main computer load information collecting program (hereinafter, referred to as main computer load information collecting means) 3 which is the program for measuring a load of the main computer 1 and for defining a measurement as load information, a main computer load information storage program (hereinafter, referred to as main computer load information storage means) 4 which is the program for storing the load information of the main computer 1 in the external storage device 5, an other computer load information reference program (hereinafter, referred to as other computer load information reference means) 6 which is the program for deriving the load information of the other computer 13 from the external storage device 5, a load information table 7 for storing the load information of the main computer 1 and the other computer 13 in the main computer 1, a computer specifying program (hereinafter, referred to as computer specifying means) 8 which is the program for specifying the computer having an allowance of the load, a job application execution computer deciding rule table 9 which stores a rule for deciding the computer which executes a job application and a load monitor item necessary for its decision therein, a decision rule register program (hereinafter, referred to as decision rule register means) 12 which is the program for storing the rule for deciding the computer which executes the job application in the job application execution computer deciding rule table 9, a computer information table 10 which stores identification information for the computer having the allowance of the load and job application distribution information, and an objective computer deciding program (hereinafter, referred to as objective computer deciding means) 11 which is the program for deciding the objective computer to which the job application is moved before scheduling with reference to the computer information table 10.

Next, an operation of the first embodiment according to the present invention will be described in detail with reference to FIGS. 1 to 9.

Figure 2:
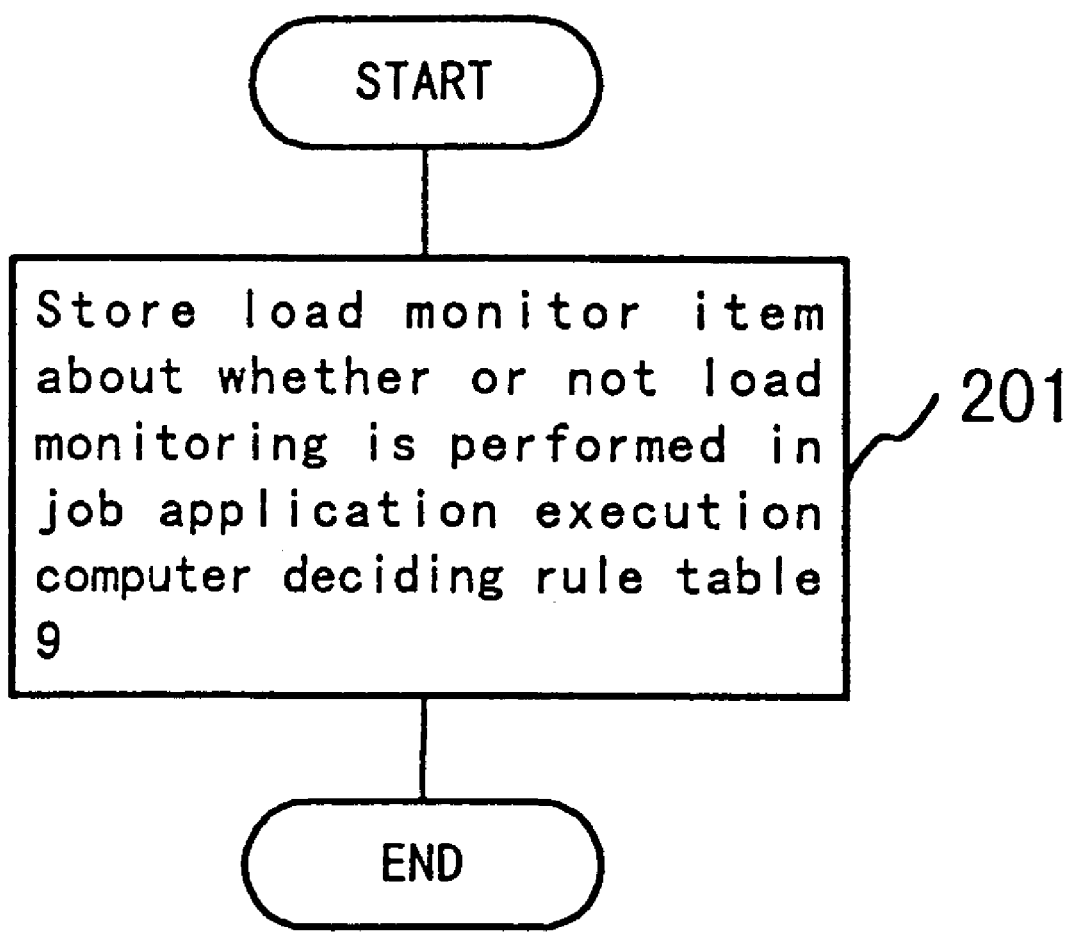
FIG. 2 is a flow chart showing a processing flow of decision rule register means 12 according to the first embodiment of the present invention.

FIG. 2 is a flow chart showing a processing flow of the decision rule register means 12.

Referring to FIGS. 1 and 2, in the main computer 1, the decision rule register means 12 previously allows the job application execution computer deciding rule table 9 to store the load monitor item as to whether or not a load monitoring is performed and as to how the computer load is monitored and how to distribute the job application in accordance with a monitor result (step 201).

Figure 6:
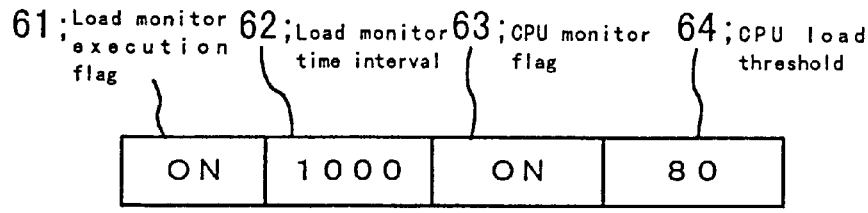
FIG. 6 shows an example of information within a job application execution computer deciding rule table 9 according to the first embodiment of the present invention.

FIG. 6 shows an example of the information within the job application execution computer deciding rule table 9 which is formed by the decision rule register means 12.

Referring to FIG. 6, a load monitor execution flag 61, which represents whether or not the load monitoring is performed, indicates "ON" being representative of performing the monitoring (when the monitoring is not performed, "OFF" is indicated and a specified value is "OFF"). When the load monitoring is performed, a load monitor time interval 62, which is a time interval for a monitoring operation, indicates "1,000 msec". A CPU monitor flag 63, which represents whether or not a usage state of a CPU is monitored, indicates "ON" being representative of performing the monitoring (when the monitoring is not performed, "OFF" is indicated and the specified value is "OFF"). A CPU load threshold 64, which represents the threshold of a CPU usage rate as a criterion for deciding whether or not the distribution is performed, indicates "80%" . In the first embodiment, the load monitor item is set to the CPU usage rate. However, the load monitor item can be appropriately set in accordance with the contents of the job application to be distributed and a system source which is most necessary when the job application is performed, such as a memory usage mount, a BKST usage amount, an I/O load to a disk device, a task usage rate of various service programs and a network channel usage rate.

Figure 3:
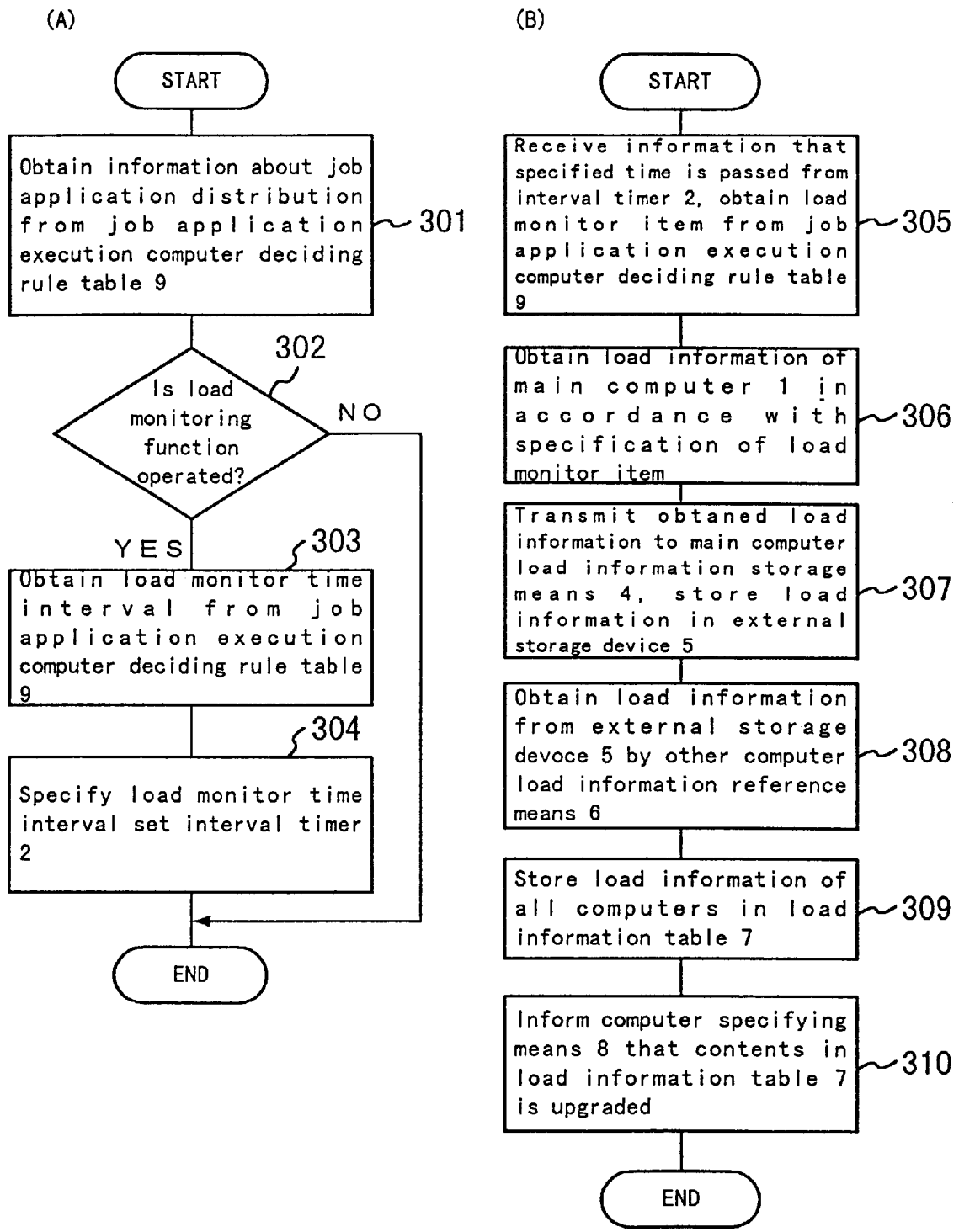
FIG. 3 is a flow chart showing the processing flow of main computer load information collecting means 3 according to the first embodiment of the present invention.

FIG. 3 is a flow chart showing the processing flow of the main computer load information collecting means 3 shown in FIG. 1.

Referring to FIGS. 1, 3 and 6, a decision rule is registered in the job application execution computer deciding rule table 9. The main computer 1 then starts the main computer load information collecting means 3. At a first start, with reference to the job application execution computer deciding rule table 9, the main computer 1 obtains the load monitor execution flag 61 which is the information representative of whether or not the job application distribution is performed (step 301).

When the job application distribution is not specified (the load monitor execution flag 61 indicates "OFF"), the main computer load information collecting means 3 is completed as it is. When the job application distribution is specified (the load monitor execution flag 61 indicates "ON"), the main computer load information collecting means 3 continues the processing for collecting the load information of the main computer 1 (step 302).

When a load monitoring function is operated (YES is indicated in step 302), the main computer load information collecting means 3 obtains, from the job application execution computer deciding rule table 9, the load monitor time interval 62 for performing at a constant time interval the operation to monitor the load of the main computer 1 (step 303). The time interval is specified, and the interval timer 2 is set (step 304).

When the interval timer 2 is set, if the interval timer 2 is independently set by each computer for a short period such as approximately 1 to a few seconds, a collecting time for the load information is not shifted to each other. Accordingly, there is no problem. However, when it is specified that the monitoring is performed at a timer ranging from a few ten seconds to 1 minute or more, the timer is set for every specified time. Preferably, all of the computers collect the load information at the same time, and a synchronizing control is performed so that a reference may be made after all the load information is upgraded.

After the interval timer 2 is set, the interval timer 2 informs the main computer load information collecting means 3 that the specified time is passed. The main computer load information collecting means 3 obtains the load monitor item which defines which load item is monitored from the job application execution computer deciding rule table 9 (step 305).

The main computer load information collecting means 3 collects the corresponding load information to the main computer 1 in accordance with a specification of the obtained load monitor item (step 306). The load monitor information is stored in the external storage device 5 by the main computer load information storage means 4 (step 307).

The external storage device 5 is the storage device which is shared among a plurality of computers. The external storage device 5 is the storage device such as memory, an electronic disk and a magnetic disk. When the processing of a step 307 is performed in each computer, the load monitor information of each computer is stored in the external storage device 5. The information is upgraded for every the interval time for the load monitoring. Thus, the latest load monitor information of each computer can be obtained from each computer with reference to the external storage device 5.

Next, the main computer load information collecting means 3 starts the other computer load information reference means 6. The load monitor information of the other computer 13, which is stored in the other computer 13, is obtained from the external storage device 5. The load monitor information is taken into the main computer 1 (step 308). The other computer load information reference means 6 reads the load monitor information of the other computer 13. The main computer load information collecting means 3 permits the load monitor information of all the computers to be stored in the load information table 7 (step 309). The main computer load information collecting means 3 starts the computer specifying means 8, and it informs that the information in the load information table 7 is upgraded (step 310).

Figure 7:
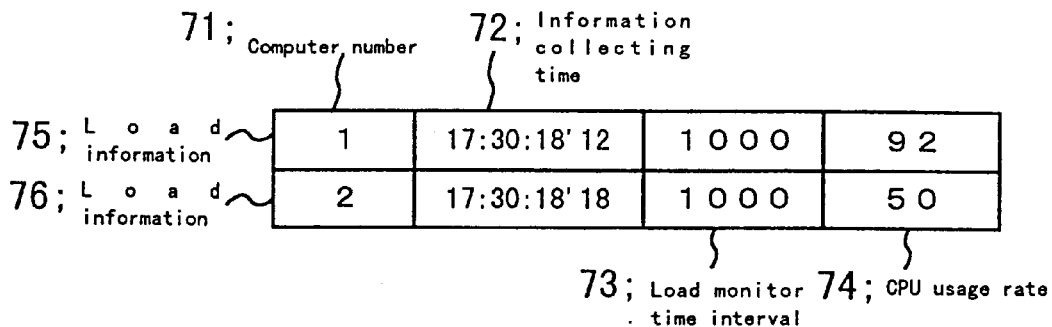
FIG. 7 shows an example of load monitor information stored in an external storage device 5 according to the first embodiment of the present invention.

FIG. 7 shows an example of the load monitor information to be stored into the external storage device 5 by the main computer load information storage means 4 and the load monitor information to be obtained from the external storage device 5 by the other computer load information reference means 6.

Referring to FIG. 7, load monitor information 75 is the load monitor information of the main computer 1. Load monitor information 76 is the load monitor information of the other computer 13. For example, the load monitor information 75 indicates the contents of each load monitor information as described below. A computer number 71, which is the identification information of the computer, is "1" . An information collecting time 72, which is representative of the time when the load information is collected, is "17:30:18' 12". A load monitor time interval 73 is "1,000 msec". The CPU usage rate is "92%" within the time interval when the load is monitored. Furthermore, the load monitor information 76 stores load monitor data therein in the same format of the load monitor information 75. The load monitor information 76 indicates that there are two computers which the job application can be distributed into since there are two pieces of information.

Figure 8:
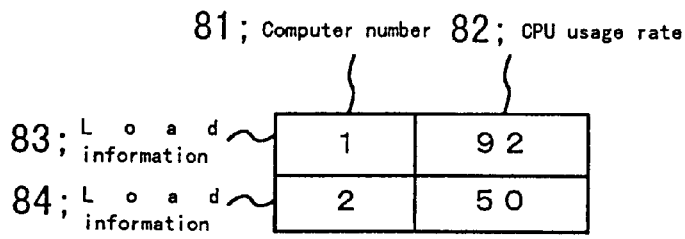
FIG. 8 shows an example of the information within a load information table 7 according to the first embodiment of the present invention.

FIG. 8 shows an example of the load monitor information of all the computers stored in the load information table 7 by the main computer load information collecting means 3.

Referring to FIG. 8, for example, load monitor information 83 indicates the following contents. A computer number 81, which represents the computer identification number, is "1". A CPU usage rate 82, which represents a CPU usage state of the computer, is "92%" . Furthermore, load monitor information 84 stores the load monitor data therein in the same format of the load monitor information 83. The load monitor information 84 indicates that there are two computers which the job application can be distributed into.

Figure 4:
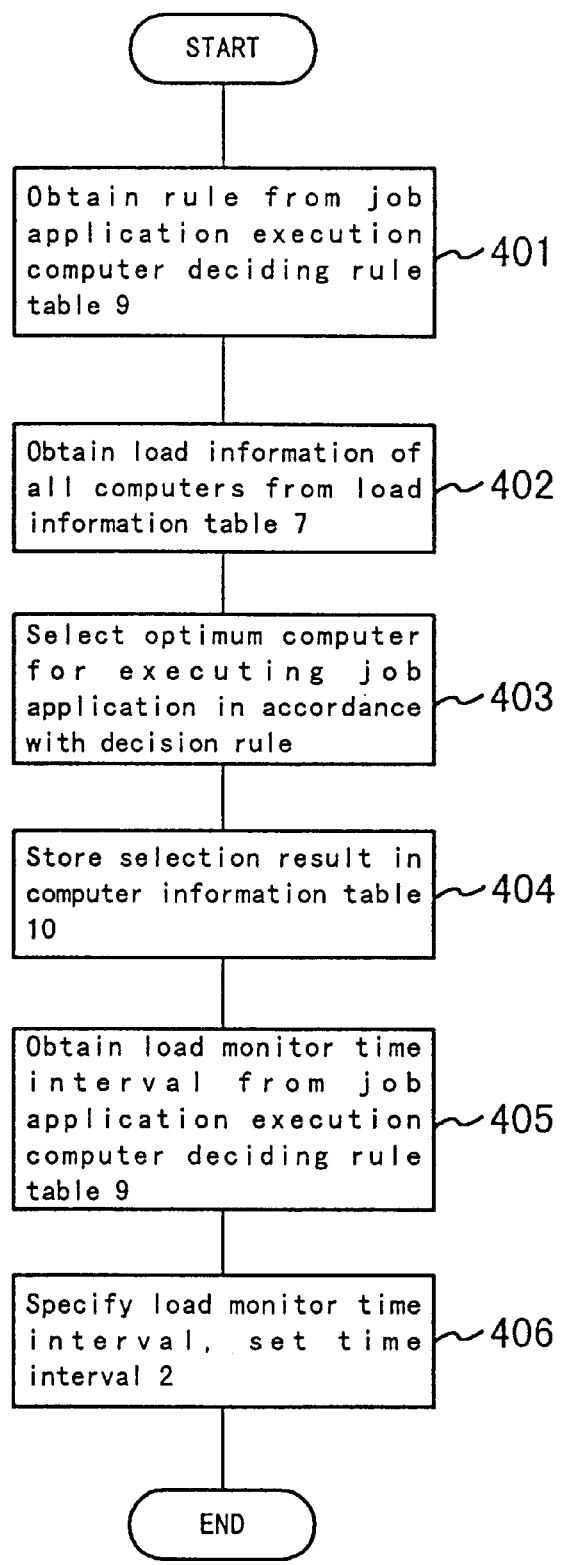
FIG. 4 is a flow chart showing the processing flow of computer specifying means 8 according to the first embodiment of the present invention.

FIG. 4 is a flow chart showing the processing flow of the computer specifying means 8 shown in FIG. 1.

Referring to FIGS. 1 and 4, in the step 310 described above, the main computer load information collecting means 3 informs the computer specifying means 8 that the information in the load information table 7 is upgraded. At this time, the computer specifying means 8 obtains the decision rule for deciding the optimum computer to execute the job application from the job application execution computer deciding rule table 9 (step 401). The computer specifying means 8 obtains the load monitor information of all the computers stored in the load information table 7 (step 402).

Next, the optimum computer to execute the job application is decided in accordance with the obtained decision rule and the load monitor information of all the computers (step 403). The identification number of the decided computer and decision information as to whether or not the job application is distributed are stored in the computer information table 10 (step 404). The computer information table 10 is upgraded. The computer specifying means 8 then obtains the load monitor time interval for performing, at the constant time interval, the operation to monitor the load of the main computer from the job application execution computer deciding rule table 9 (step 405). The obtained load monitor time interval is specified, and the interval timer 2 is set (step 406). Thus, the main computer load information collecting means 3 is continuously started from the interval timer 2.

Figure 9:
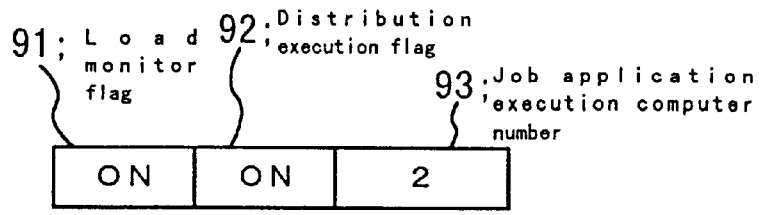
FIG. 9 shows an example of the information within a computer information table 10 according to the first embodiment of the present invention.

FIG. 9 shows an example of the information as to the job application distribution stored in the computer information table 10 by the computer specifying means 8.

Referring to FIG. 9, for example, a load monitor flag 91 is indicative of whether or not the load monitor function is operated in the main computer 1. The load monitor flag 91 indicates "ON" which represents that the load monitoring is performed (when the load monitoring is not performed, "OFF" is indicated and the specified value is "OFF"). A distribution execution flag 92 is representative of whether the job application is distributed among the computers or the job application is executed in the main computer without a performing the distribution. The distribution execution flag 92 indicates "ON" which indicates that the distribution is performed (when the distribution is not performed, "OFF" is indicated and the specified value is "OFF"). A job application execution computer number 93 is the identification information of the optimum computer to execute the job application. The job application execution computer number 93 indicates "2" which is the identification number of the other computer 13.

Hereinafter, with the examples shown in FIGS. 6, 8 and 9, the processing will be concretely described to determine the contents in the computer information table 10 in accordance with the load information table 7 and the job application execution computer deciding rule table 9.

Referring to FIGS. 1 and 4, when the job application execution computer deciding rule table 9 is as the case shown in FIG. 6 in the step 401, the computer specifying means 8 obtains the information that the CPU usage state is monitored since the CPU monitor flag 63 indicates "ON". Since the CPU load threshold 64 is "80%", the computer specifying means 8 collects the information which indicates the rule that the load is distributed when the CPU usage rate exceeds 80%. Next, when the load information table 7 is as the case shown in FIG. 8 in the step 402, the computer specifying means 8 obtains the information which indicates the CPU usage rate 82 of the other computer 13 is "50%" when the CPU usage rate 82 of the main computer 1 is "92%".

In the first place, the computer specifying means 8 turns "ON" the load monitor flag 91 since the load monitor information is present in the load information table 7. Moreover, since the CPU usage rate of the main computer 1 exceeds the threshold "80%" in accordance with the CPU usage rate in the obtained information, the load of the main computer 1 is higher. Accordingly, it is determined that the job application should be distributed into the main computer 1. Furthermore, since the CPU usage rate of the other computer 13 is "50%", the other computer 13 has the allowance of the load compared to the main computer 1. Accordingly, the computer specifying means 8 turns "ON" the distribution execution flag 92. The identification number "2" of the other computer 13 is stored in the job application execution computer number 93.

Figure 10:
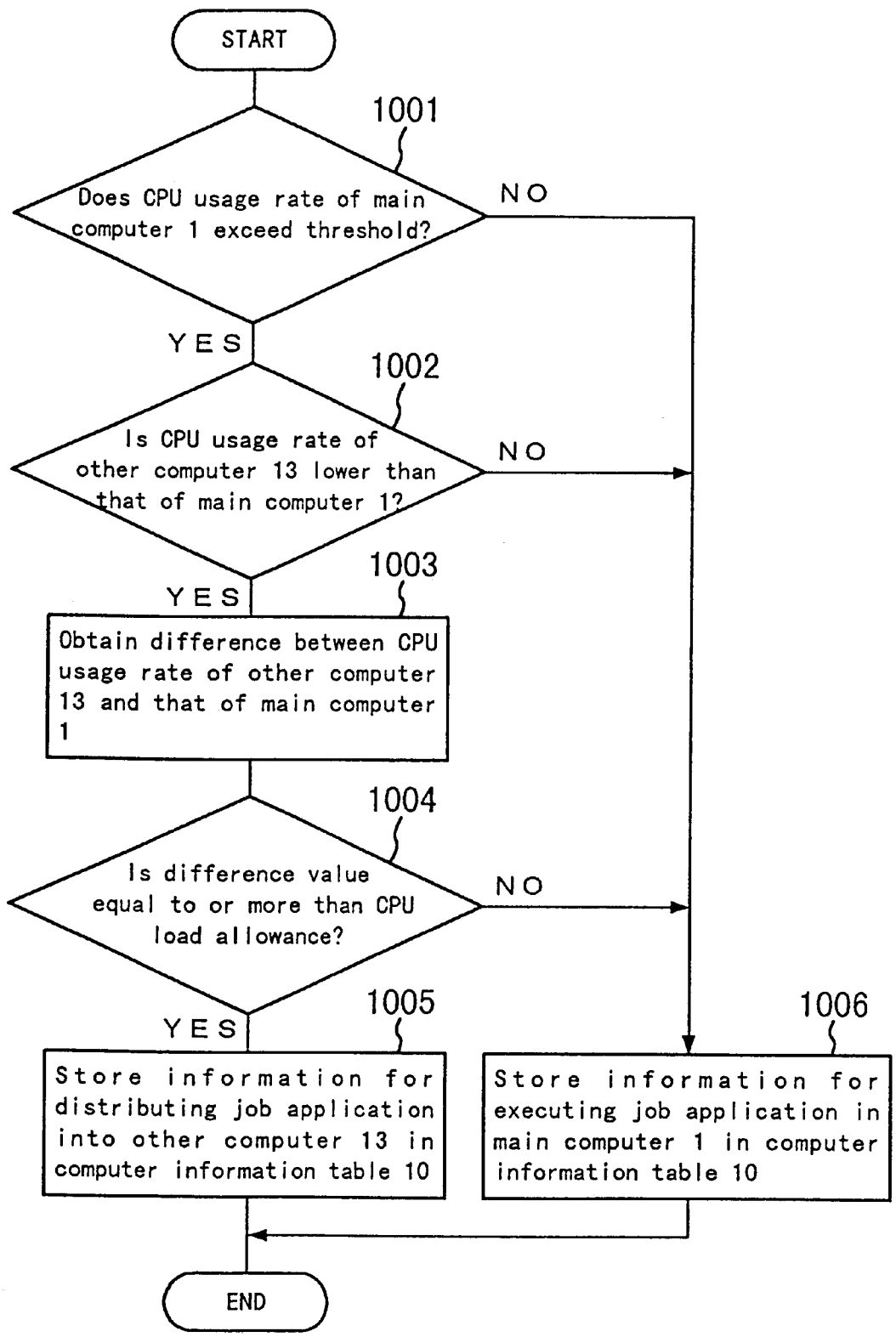
FIG. 10 is a flow chart showing the processing flow of a job application distribution by the means of a threshold and an allowance of the computer specifying means 8 according to a second embodiment of the Present invention.

In such a manner, when the job application execution computer deciding rule table 9 is as shown in FIG. 6 and the load information table 7 is as shown in FIG. 8, the computer information table 10 shown in FIG. 10 is formed.

Figure 5:
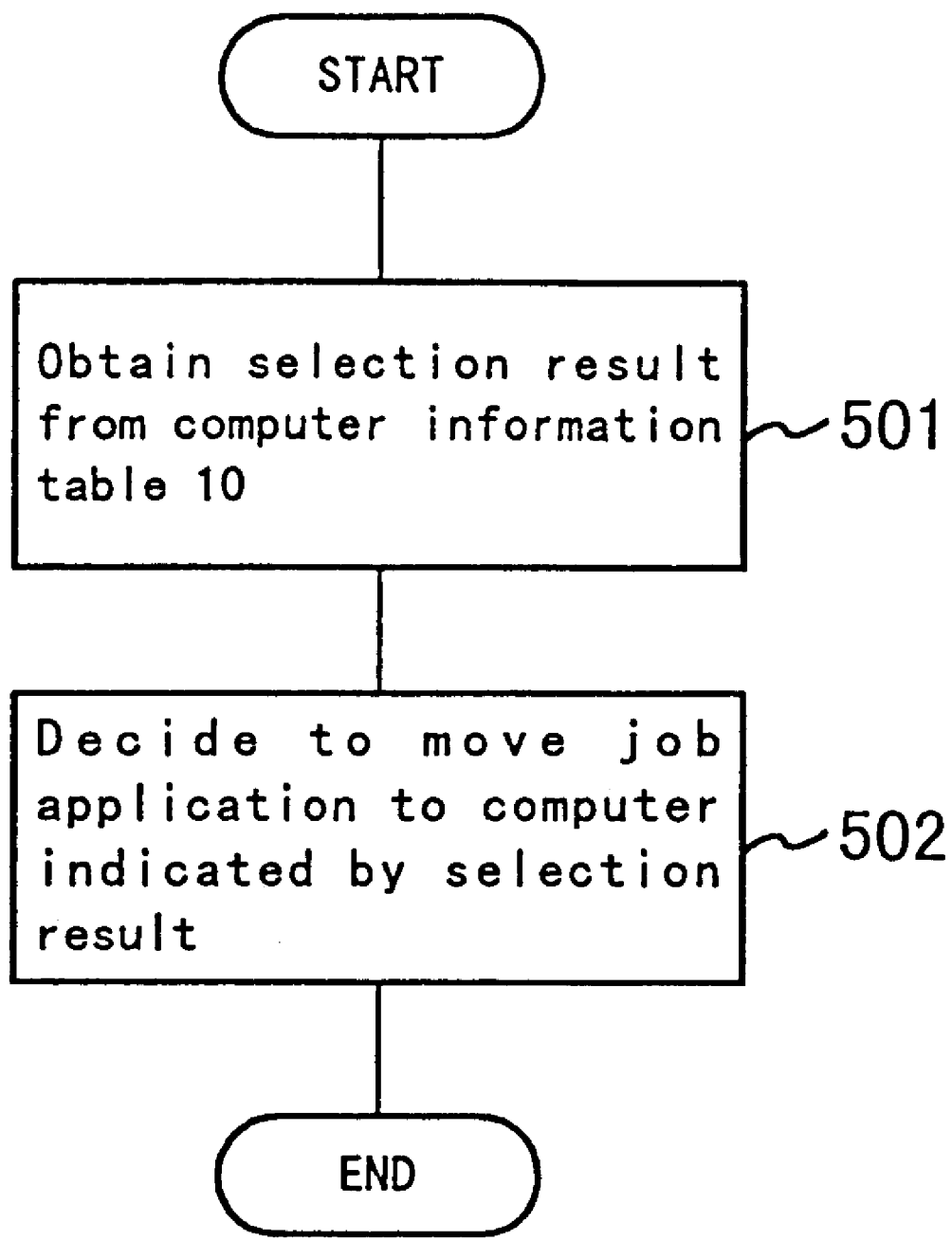
FIG. 5 is a flow chart showing the processing flow of objective computer deciding means 11 according to the first embodiment of the present invention.

FIG. 5 is a flow chart showing the processing flow of the objective computer deciding means 11 shown in FIG. 1.

Referring to FIGS. 1 and 5, when the job application which is executable either in the main computer 1 or the other computer 13 is loaded to the main computer 1, the objective computer deciding means 11 decides which computer executes the job application. That is, the information as to the job application distribution is obtained from the computer information table 10 (step 501). The objective computer deciding means 11 decides to move the job application before scheduling to the computer which is indicated by the information (step 502).

Hereinafter, when the contents in the computer information table 10 is as shown in FIG. 9, the processing will be concretely described to determine the objective computer which executes the job application which is performed by the objective computer deciding means 11.

In the step 501, the objective computer deciding means 11 obtains the load monitor flag 91 being "ON", the distribution execution flag 92 being "ON" and the job application execution computer number 93 being "2" from the computer information table 10. Next, in the step 502, the objective computer deciding means 11 knows that the load is monitored in the main computer 1 since the load monitor flag is "ON". Because of the distribution execution flag 92 being "ON", since the load of the main computer 1 is higher, the objective computer deciding means 11 recognizes that it is more efficient to distribute the job application among the computers. Since the job application execution computer number 93 is "2", the objective computer deciding means 11 decides to move the job application prior to scheduling to the other computer 13 having the lower load.

As described above, the load of each computer is upgraded in accordance with a job application distribution deciding rule. The load monitor information is upgraded for each constant time. It is decided to move the job application prior to scheduling to the optimum computer for executing the job application. Thus, a job application distribution processing is performed among a plurality of computers.

When two or more other computers 13 are present, the above processing is repeated to respective computers. When there is another computer having more allowance of the CPU usage rate than the main computer 1, it is decided to move the job application prior to scheduling to the computer.

It should be noted that the detailed description is omitted in the first embodiment. The job application, which the objective computer deciding means 11 decides to move to the other computer 13, is moved to the other computer 13 by the use of any method through any known transmitting means and the external storage device 5.

In such a manner, the operation of the first embodiment of the present invention is completed.

According to the first embodiment of the present invention, the main computer load information collecting means 3 is started for every constant time. The load monitor information stored in the external storage device 5 is upgraded. At the same time, the load monitor information of the other computer is taken into the main computer. The contents in the computer information table 10 is upgraded. Accordingly, the job application distribution can be performed while preventing an overhead necessary for the load monitoring, compared to a conventional system in which the load of the other computer is collected whenever the job application execution is required. Such an effect is achieved.

Next, a second embodiment of the present invention will be described in detail with reference to the accompanying drawings.

In the second embodiment of the present invention, the job application execution computer deciding rule table 9 in the first embodiment stores the threshold of the CPU usage rate and the allowance which is defined as a difference of the CPU usage rate between the main computer 1 and the other computer 13 therein. When the CPU usage rate of the main computer 1 exceeds the threshold, if the CPU usage rate of the other computer 13 is lower than that of the main computer 1 and if the CPU usage rate difference between the other computer 13 and the main computer 1 is more than the allowance within the job application execution computer deciding rule table 9, the computer specifying means 8 is so constructed that it may be decided to move the job application to the other computer. In the second embodiment, the case that the CPU usage rate is monitored will be described in detail. However, the threshold and constant allowance of the usage rate of another load monitor item may be similarly set so as to perform the control.

Next, the operation of the second embodiment according to the present invention will be described in detail with reference to FIGS. 1, 10 and 11.

Figure 11:
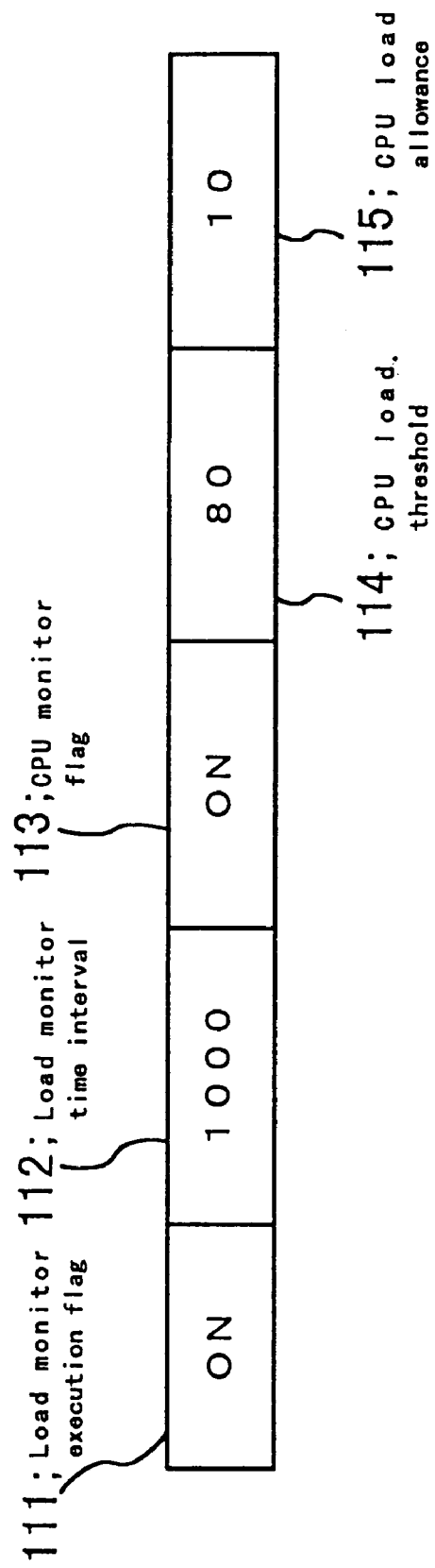
FIG. 11 shows an example of the information within the job application execution computer deciding rule table 9 according to the second embodiment of the present invention.

FIG. 11 shows an example of the information within the job application execution computer deciding rule table 9 which is formed by the decision rule register means 12.

Referring to FIG. 11, a load monitor execution flag 111 indicates whether or not the load monitoring is performed. The load monitor execution flag 111 indicates "ON" which represents that the monitoring is performed (when the monitoring is not performed, "OFF" is indicated and the specified value is "OFF"). A load monitor time interval 112 is indicative of the time interval for performing the monitor operation when the load monitoring is performed. The load monitor time interval 112 indicates "1,000 msec". A CPU monitor flag 113 indicates whether or not the CPU usage state is monitored. The CPU monitor flag 113 indicates "ON" which represents that the monitoring is performed (when the monitoring is not performed, "OFF" is indicated and the specified value is "OFF"). The CPU load threshold 64 represents the threshold of the CPU usage rate as the criterion for performing the distribution. The CPU load threshold 64 indicates "80%". Furthermore, a CPU load allowance 115 indicates the degree by which the CPU usage rate of the other computer 13 must be lower than that of the main computer 1 when the job application is distributed into the other computer 13. The CPU load allowance 115 indicates "10%".

FIG. 10 is a flow chart showing the processing flow of the job application distribution by the means of the threshold and the allowance of the computer specifying means 8.

Referring to FIGS. 1 and 10, the computer specifying means 8 decides whether or not the CPU usage rate of the main computer 1 exceeds the threshold of the CPU load (step 1001). When the CPU usage rate exceeds the threshold, it is decided whether or not the CPU usage rate of the other computer 13 is lower than that of the main computer 1 (step 1002). When the CPU usage rate is lower, the CPU usage rate difference between the main computer 1 and the other computer 13 is obtained (step 1003). It is decided whether or not the difference is equal to or more than a value of the CPU load allowance (step 1004). When the difference is equal to or more than the value of the CPU load allowance, the identification information of the other computer 13 and the information as to the job application distribution are stored in the computer information table 10 so as to move the job application prior to scheduling to the other computer 13 having the allowance of the CPU (step 1005). When the difference is less than the value of the CPU load allowance, the identification information of the main computer 1 and the information as to the job application distribution are stored in the computer information table 10 so as to execute all the job application in the main computer 1 (step 1006).

When two or more other computers 13 are present, the above processing is repeated to each other computer. The job application prior to scheduling is moved to the computer having the largest allowance.

As described above, the operation of the second embodiment of the present invention is completed.

In the second embodiment of the present invention, only when the other computer 13 has the CPU usage rate allowance which is equal to or more than a constant value rather than the main computer 1, the job application prior to scheduling is moved to the other computer 13. Thus, it is possible to operate so as not to move the job application to the computer having little allowance of the CPU usage rate. Even if the job application is moved to the computer having little allowance, the resultant deterioration of the performance can be avoided. Such an effect is obtained. Next, a third embodiment of the present invention will be described in detail with reference to the accompanying drawings.

In the third embodiment of the present invention, when the CPU usage rate of the main computer 1 exceeds the threshold, the computer specifying means 8 in the first embodiment decreases a rate value of the job application which is stored in the computer information table 10 and is to be processed in the main computer 1. The objective computer deciding means 11 decides that the job application is moved to the other computer 13 in accordance with the decreased value.

Next, the operation of the thlird embodiment of the present invention will be described in detail with reference to FIGS. 1 and 12 to 14.

Figure 12:
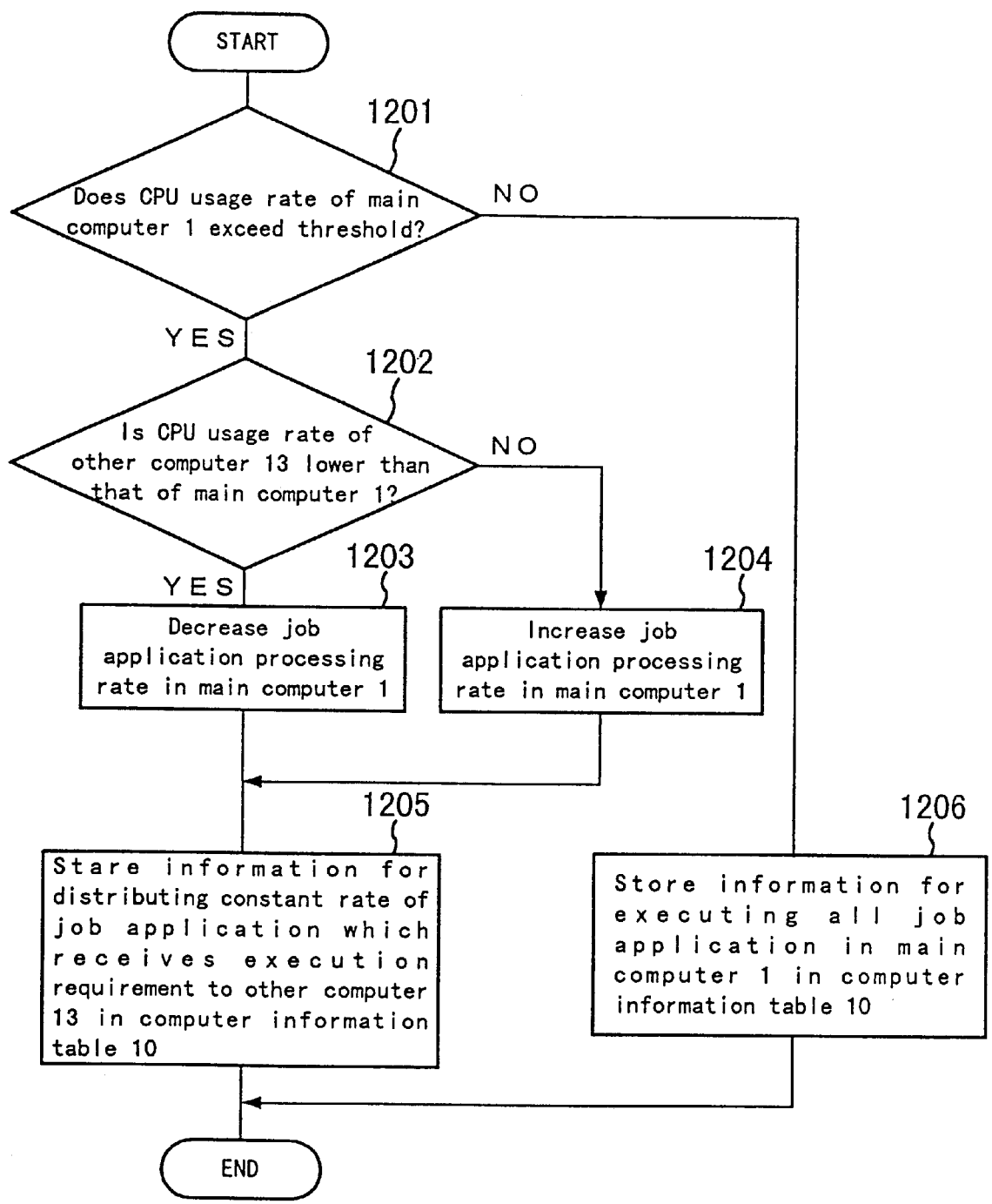
FIG. 12 is a flow chart showing the processing flow of the job application distribution by a variation of the threshold and a processing rate of the computer specifying means 8 according to a third embodiment of the present invention.

FIG. 12 is a flow chart showing the processing flow of the job application distribution by a variation of the threshold and a processing rate of the computer specifying means 8.

Referring to FIGS. 1 and 12, the computer specifying means 8 decides whether or not the CPU usage rate of the main computer 1 exceeds the threshold (step 1201). When the CPU usage rate exceeds the threshold, the CPU usage rate of the other computer 13 is compared to that of the main computer 1 (step 1202). When the CPU usage rate of the other computer 13 is lower than that of the main computer 1, namely when the other computer 13 has more allowance, the processing rate in the main computer 1 is decreased (step 1203). On the contrary, when CPU usage rate of the other computer 13 is higher than that of the main computer 1, the processing rate in the main computer 1 is increased (step 1204). The upgraded processing rate is stored in the computer information table 10 (step 1205). When the job application distribution is not performed, the job application processing rate of the main computer 1 is set to 100% in the computer information table 10 so that all the job application may be executed in the main computer 1 (step 1206).

When the job application processing rate of the main computer 1 is decreased, a lower limit value which executes a constant job application in the main computer 1 may be set so as to prevent the load necessary for executing the job application as it is in the main computer 1 and the load necessary for moving the job application from inverting. In this case, the job application processing rate is varied from the lower limit value to 100%.

Figure 13:
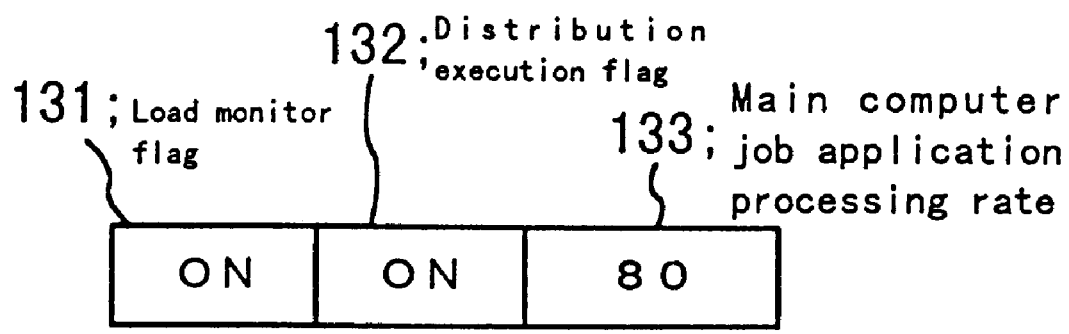
FIG. 13 shows an example of contents in the computer information table 10 according to the third embodiment of the present invention.
Figure 14:
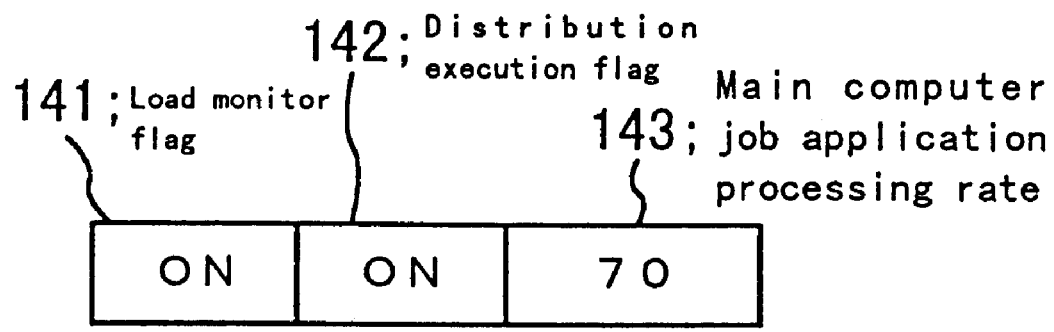
FIG. 14 shows an example of the contents after changing the computer information table 10 according to the third embodiment of the present invention.

FIGS. 13 and 14 show an example of the contents in the computer information table 10.

Referring to FIG. 13, there is shown that a main computer job application processing rate 133 is "80%". That is, when the 100 job applications are loaded into the main computer 1 for a constant period, the 80 job applications of them are processed in the main computer 1 and the remaining 20 job applications are processed in the other computer 13. Furthermore, when the CPU usage rate of the main computer 1 is larger than that of the other computer 13, the main computer job application processing rate 133 is decreased. As shown by a main computer job application processing rate 143 of FIG. 14, the main computer job application processing rate 143 is upgraded to the value such as "70%".

The objective computer deciding means 11 decides to execute the corresponding number of the job application to the job application processing rate in the main computer 1 with reference to the main computer job application processing rate 133 in the computer information table 10. The objective computer deciding means 11 decides to move the remaining job application to the other computer 13.

When two or more other computers 13 are present, the above processing is repeated to the respective computers. The job application processing rate is decreased in the computer having more load. The job application processing rate is increased in the computer having less load. The job application is moved among each computer.

As described above, the operation of the third embodiment of the present invention is completed.

In the third embodiment of the present invention, the job application processing rate which is set in each computer is increased and decreased in accordance with a load state of each computer. Thus, it is decided to move the job application among each computer. Accordingly, the job application processing rate appropriate for each computer can be set. Each computer can be operated in the appropriate load state. Such an effect is obtained.

Next, a fourth embodiment of the present invention will be described in detail with reference to the accompanying drawings.

In the fourth embodiment of the present invention, the load information table 7 of the first embodiment stores the CPU usage rate of each computer and an index indicative of a CPU performance of each computer (CPU performance value) therein. When the CPU usage rate of the main computer 1 exceeds the threshold, the computer specifying means 8 multiplies the rate of an idle time of the CPU by the CPU performance value of each computer in each computer with reference to the load information table 7. The computer specifying means 8 decides to execute the job application in the computer having the largest value.

Next, the operation of the fourth embodiment of the present invention will be described in detail with reference to FIGS. 1 and 15 to 19.

Figure 15:
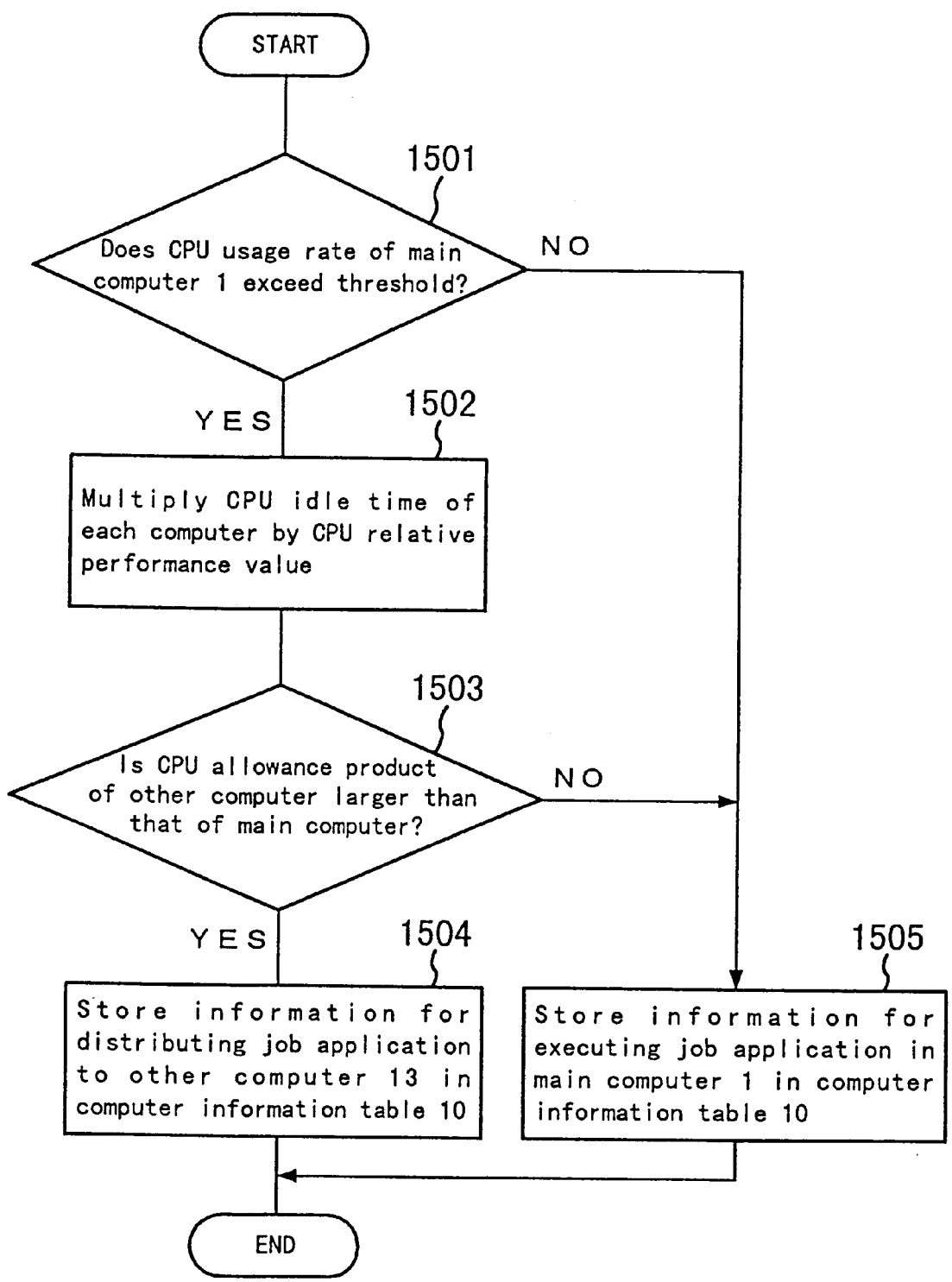
FIG. 15 is a flow chart showing the processing flow of the job application distribution by a product of a CPU idle time and a CPU performance value of the computer specifying means 8 according to a fourth embodiment of the present invention.

FIG. 15 is a flow chart showing the processing flow of the job application distribution by a product of the CPU idle time and the CPU performance value of the computer specifying means according to the fourth embodiment of the present invention.

Referring to FIGS. 1 and 15, the computer specifying means 8 decides whether or not the CPU usage rate of the main computer 1 exceeds the CPU load threshold (step 1501). When the CPU usage rate exceeds the threshold, the rate of the CPU idle time is obtained from the CPU usage rate of each computer. The rate is multiplied by the CPU performance value of each computer (step 1502). The resultant product of the main computer 1 is compared to that of the other computer 13 (step 1503). When the product of the other computer 13 is larger than that of the main computer 1, the computer specifying means 8 decides that the other computer 13 has the larger allowance of processibility. The information for moving the job application to the other computer 13 is stored in the computer information table 10 (step 1504). On the contrary, when the product of the other computer 13 is smaller than that of the main computer 1, the information for executing the job application in the main computer 1 is stored in the computer information table 10 (step 1505).

The CPU performance value may be the number of instruction execution per unit time (such as a MIPS (Million Instruction Per Second)) or a relative performance value which is compared to the performance value of a particular computer as a certain criterion and indicates how degree of a CPU processing performance each computer has. That is, as long as each computer has the same index, any performance value as to the CPU can be used.

FIG. 16 shows an example of the information within the job application execution computer deciding rule table 9 which is formed by the decision rule register means 12.

Referring to FIG. 16, a CPU weighting flag 165 indicates "ON". The "ON" is representative of using the product which results from multiplying the CPU performance value by the CPU idle time rate so that a comparison is performed (when a weighting is not performed, "OFF" is indicated and the specified value is "OFF"). Thus, the computer specifying means 8 decides to perform the processing in the step 1502 described above.

FIG. 17 shows an example of the load monitor information to be stored in the external storage device 5 by the main computer load information storage means 4 and the load monitor information to be obtained from the external storage device 5 by the other computer load information reference means 6.

Referring to FIG. 17, for example, the item of a CPU performance value 175 is stored in each computer. For example, when a computer number 171 is "1", the CPU performance value 175 is "200". When the computer number 171 is "2", the CPU performance value 175 is "300".

FIG. 18 shows an example of the information which is stored in the load information table 7 by the main computer load information collecting means 3 and is associated with the load of all the computers.

Referring to FIG. 18, for example, load information 184 indicates the following contents. Namely, a computer number 181 is "1". A CPU usage rate 182 is "90%". A CPU performance value 183 is "200". Load information 185 indicates the following contents. Namely, the computer number 181 is "2". The CPU usage rate 182 is "50%". The CPU performance value 183 is "30".

FIG. 19 shows, in the form of a table, the value which is calculated in the step 1502 processing by the computer specifying means 8 when the data shown in FIG. 18 is stored in the load information table 7.

Referring to FIG. 19, although the CPU usage rate of the computer number "1" is higher than that of the computer number "2", the CPU performance value of the computer number "1" is larger than that of the computer number "2". Accordingly, the computer number "1" has more allowance of the CPU processibility in accordance with the calculation result. Thus, the job application is moved to the computer number "1".

When two or more other computers 13 are present, the above processing repeated to the respective computers. The job application is moved to the computer having the largest allowance of the CPU processibility.

As described above, the operation of the fourth embodiment of the present invention is completed.

In the fourth embodiment, the product of the CPU idle time and the CPU performance value is used so as to estimate the allowance of the CPU processibility of each computer. Thus, even if each computer has a different CPU processibility, the job application is moved so that the CPU processibility allowance of each computer may be equal to each other, which permits the load to be distributed. Such an effect is achieved.

Next, a fifth embodiment of the present invention will be described in detail with reference to the accompanying drawings.

In the fifth embodiment, the main computer load information collecting means 3 of the first embodiment collects the information as to a plurality of any other load monitor items than the CPU usage rate. The computer specifying means 8 judges whether or not a plurality of load monitor items exceed the threshold in accordance with a predetermined priority order. The load monitor items are compared to one another by means of the priority order. The computer having less load is determined. The job application is moved to the computer.

Next, the operation of the fifth embodiment of the present invention will be described in detail with reference to FIGS. 1, 20 and 21.

Figure 20:
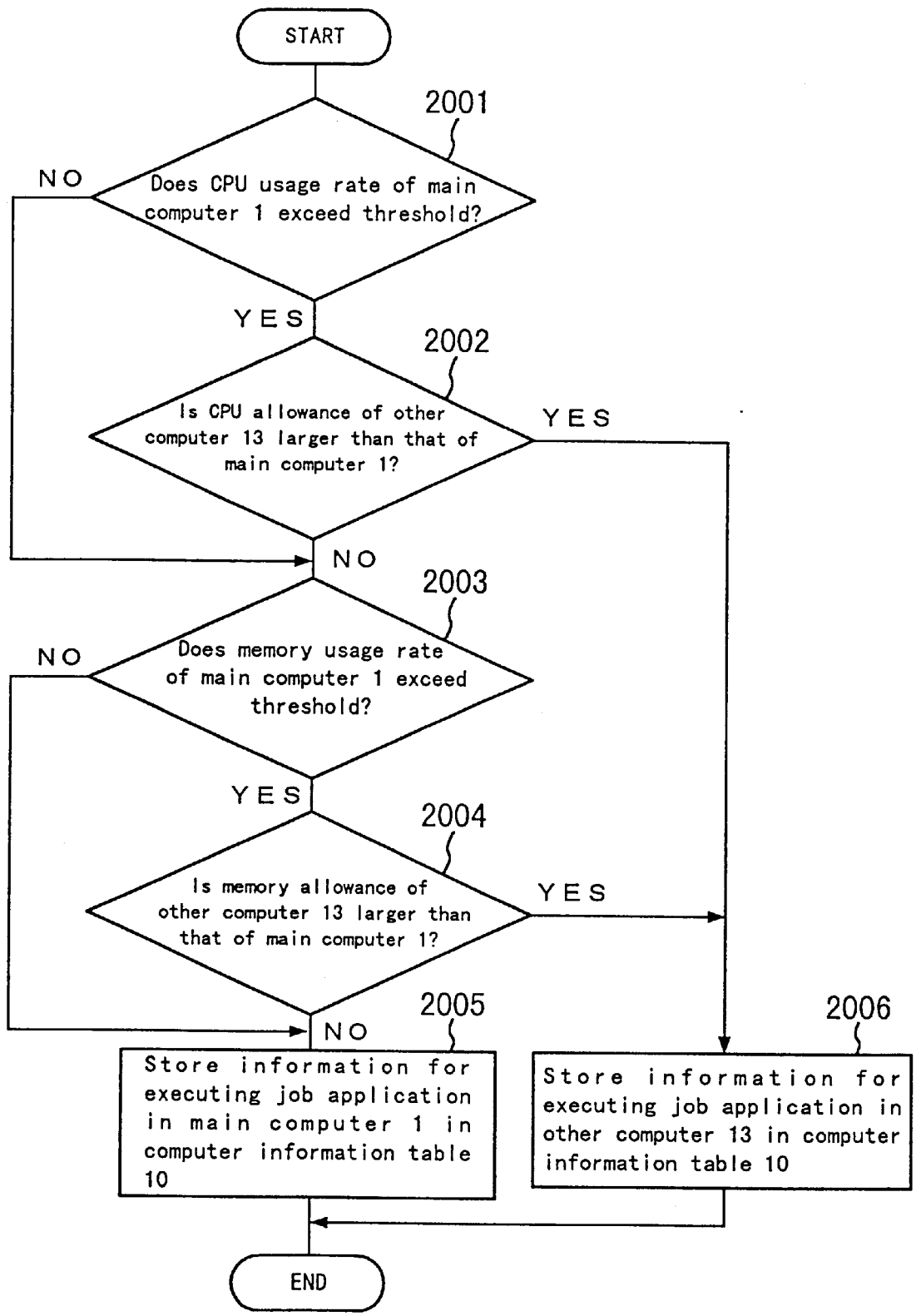
FIG. 20 is a flow chart showing the processing flow of the job application distribution by means of a plurality of load monitor items of the computer specifying means 8 according to a fifth embodiment of the present invention.

FIG. 20 is a flow chart showing the processing flow of the job application distribution by means of a plurality of load monitor items of the computer specifying means according to the fifth embodiment of the present invention.

In the fifth embodiment, two load monitor items, that is, the CPU usage rate and a memory usage rate are set. A monitor priority order is determined in the order that the memory usage rate follows the CPU usage rate.

Referring to FIGS. 1 and 20, the computer specifying means 8 judges whether or not the CPU usage rate of the main computer 1 exceeds the CPU load threshold (step 2001). When the CPU usage rate exceeds the threshold, the computer specifying means 8 judges whether or not the other computer 13 has more CPU allowance (step 2002).

When the other computer 13 has less allowance, the subsequent load monitor item is compared, where it is judged whether or not the memory usage rate of the main computer 1 exceeds the threshold (step 2003). When the memory usage rate exceeds the threshold, it is judged whether or not the other computer 13 has more memory allowance (step 2004). When the other computer 13 has less allowance, the identification information of the main computer 1 is stored in the computer information table 10 so as to execute the job application in the main computer 1 (step 2005). In the step 2002 or 2004, when it is decided that the other computer 13 has more allowance, the identification information of the other computer 13 is stored in the computer information table 10 (step 2006).

Referring to FIG. 20, there is shown the case that two load monitor items are present. Even if three or more load monitor items are present, the above judgment is similarly repeated. When other computer sources have the allowance, the identification information of the other computer is stored in the computer information table 10.

Figure 21:
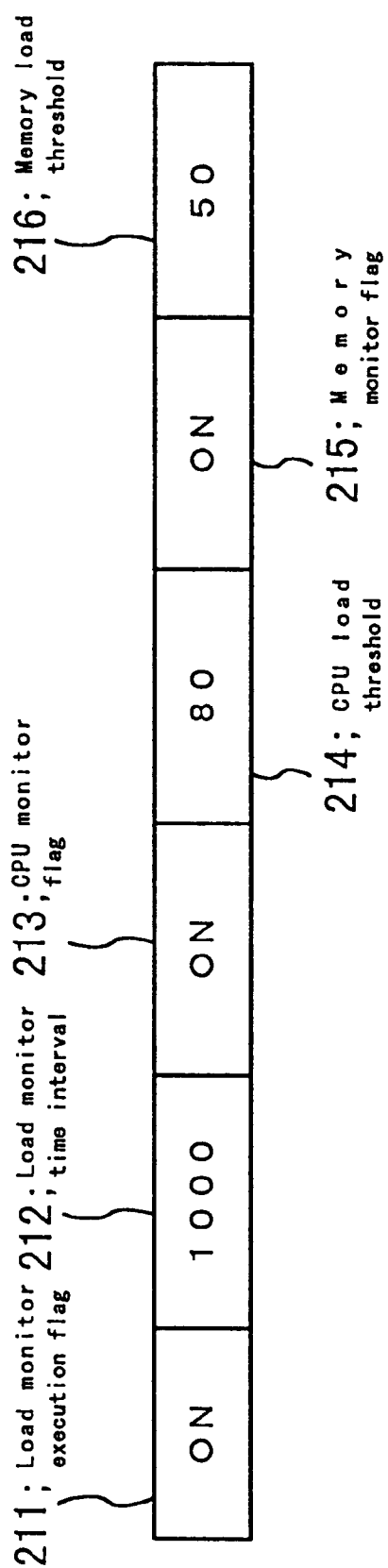
FIG. 21 shows an example of the information within the job application execution computer deciding rule table 9 according to the fifth embodiment of the Present invention.

FIG. 21 shows an example of the information within the job application execution computer deciding rule table 9 which is formed by the decision rule register means 12.

Referring to FIG. 21, after a CPU monitor flag 213 and a CPU load threshold 214, a memory monitor flag 215 indicates "ON" which represents that the memory usage rate is monitored (when the monitoring is not performed, "OFF" is indicated and the specified value is "OFF"). A memory load threshold 216 indicates the threshold of a memory usage state as the criterion for performing the distribution. The memory load threshold 216 indicates "50%". The priority for monitoring the load is determined in the order that the memory load follows the CPU load. When three or more load monitor items are set, the memory load threshold 216 of FIG. 21 is stored and subsequently the contents of another monitor item and the corresponding threshold are stored.

When two or more other computers are present, the above processing is repeated to each computer. The job application is moved to the computer having the largest allowance.

As described above, the operation of the fifth embodiment of the present invention is completed.

In the fifth embodiment, a plurality of load monitor items are set. Even if the decision is made that the job application distribution is not performed in accordance with a single job application distribution item, the job application distribution can be performed when the computer having the allowance is present in accordance with another load monitor item. Such an effect is achieved.

Next, a sixth embodiment of the present invention will be described in detail with reference to the accompanying drawings.

In the sixth embodiment of the present invention, the main computer load information collecting means 3 of the first embodiment obtains each CPU usage rate of all the job applications including the high CPU usage priority job application and the low CPU usage priority job application. When the CPU usage rate associated with all the job applications in the main computer 1 exceeds the threshold, the computer specifying means 8 judges whether or not the CPU usage rate, which is associated with the high CPU usage priority job application, exceeds the threshold. When the CPU usage rate does not exceed the threshold, the computer specifying means 8 decides so as not to move the high CPU usage priority job application. When the CPU usage rate, which is associated with the high CPU usage priority job application, exceeds the threshold, the objective computer deciding means 11 decides to move all the job applications.

Next, the operation of the sixth embodiment of the present invention will be described in detail with reference to FIGS. 1 and 22 to 25.

Figure 24:
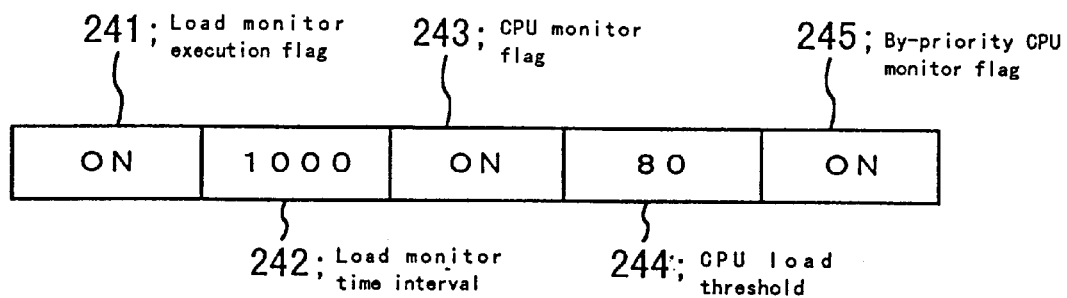
FIG. 24 shows an example of the information within the job application execution computer deciding rule table 9 according to the sixth embodiment of the present invention.

FIG. 24 shows an example of the information within the job application execution computer deciding rule table 9 which is formed by the decision rule register means 12.

Referring to FIG. 24, a by-priority CPU monitor flag 245 indicates whether or not the CPU usage rate of the high CPU usage priority job application alone is monitored. The by-priority CPU monitor flag 245 indicates "ON" which represents that the monitoring is performed (when the monitoring is not performed, "OFF" is indicated and the specified value is "OFF"). At this time, the main computer load information collecting means 3 collects the load monitor information of the usual entire CPU. At the same time, the main computer load information collecting means 3 calculates a CPU usage time of the high CPU usage priority job application such as an on-line job application so as to obtain the CPU usage rate.

Figure 22:
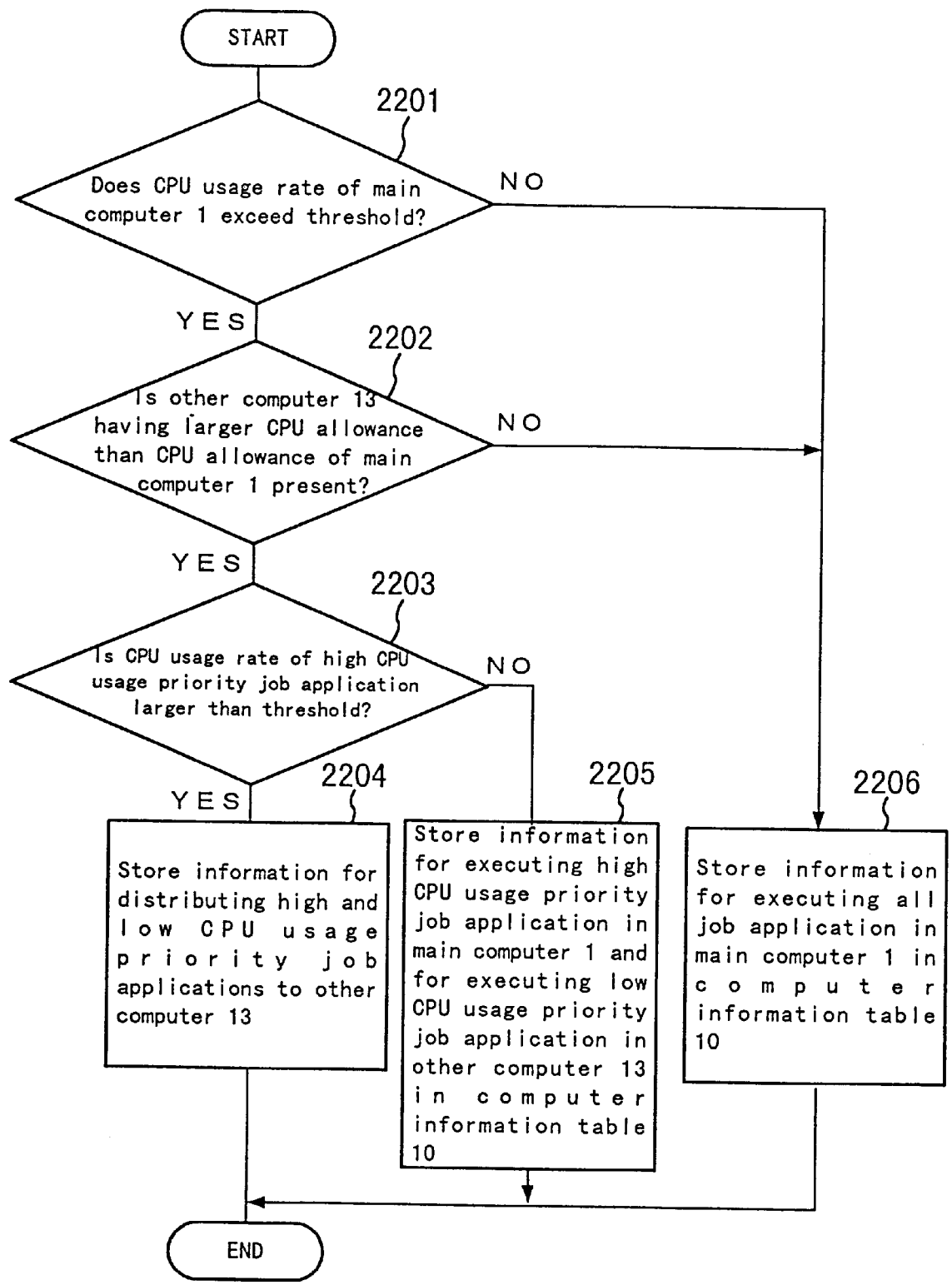
FIG. 22 is a flow chart showing the processing flow of the job application distribution which performs a monitoring by each CPU usage priority of the computer specifying means 8 according to a sixth embodiment of the present invention.

FIG. 22 is a flow chart showing the processing flow of the job application distribution which performs the monitoring by each CPU usage priority of the computer specifying means 8 according to the sixth embodiment of the present invention.

Referring to FIGS. 1 and 22, the computer specifying means 8 judges whether or not the CPU usage rate of the entire job application in the main computer 1 exceeds the threshold (step 2201). When the CPU usage rate doe not exceed the threshold, the identification information of the main computer 1 and the information as to the job application distribution are stored in the computer information table 10 so that all the job application may be executed in the main computer 1 (step 2206). When the CPU usage rate of the entire job application exceeds the threshold, it is judged whether or not the other computer 13 is present which has the CPU usage rate less than the CPU usage rate of the main computer 1, that is, which has the allowance of the CPU (step 2202). When the other computer 13 having the allowance of the CPU is not present, the identification number of the main computer 1 and the information as to the job application distribution are stored in the computer information table 10 so that all the job application may be executed in the main computer 1 (step 2206). When the other computer 13 having the allowance of the CPU is present, it is judged whether or not the CPU usage rate associated with the high CPU usage priority job application exceeds the threshold (step 2203). When the CPU usage rate does not exceed the threshold, the identification numbers of the respective computers and the information as to the job application distribution are stored in the computer information table 10 so that the high CPU usage priority job application may be executed in the main computer 1 and the low CPU usage priority job application may be moved to the other computer 13 (step 2205). On the contrary, when the CPU usage rate of the high CPU usage priority job application alone exceeds the threshold, the identification number of the other computer 13 and the information as to the job application distribution are stored in the computer information table 10 so that all the job application may be moved to the other computer 13 (step 2204).

Figure 25:
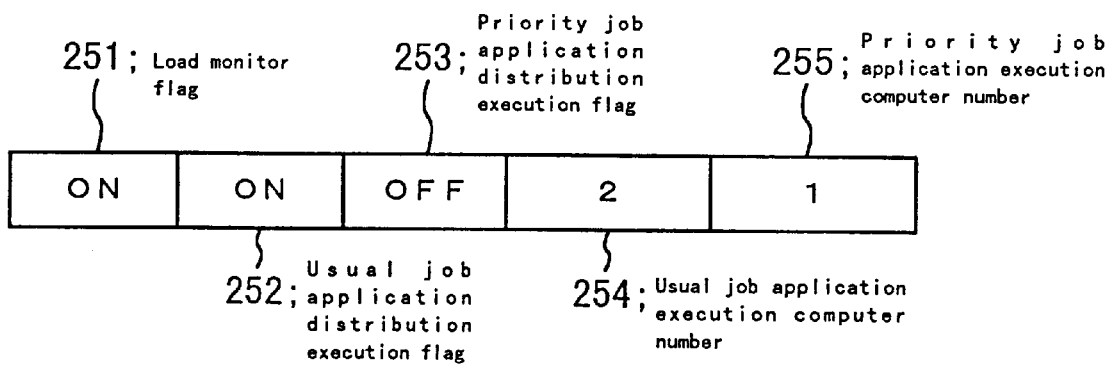
FIG. 25 shows an example of the information within the computer information table 10 according to the sixth embodiment of the present invention.

FIG. 25 shows an example of the information within the computer information table 10 which is formed by the computer specifying means 8.

Referring to FIG. 25, a usual job application distribution execution flag 252 indicates whether or not the job application having the usual CPU usage priority is moved. The usual job application distribution execution flag 252 indicates "ON" which represents that a movement of the job application is performed (when the movement of the job application is not performed, "OFF" is indicated and the specified value is "OFF"). A priority job application distribution execution flag 253 indicates whether or not the high CPU usage priority job application is moved. The priority job application distribution execution flag 253 indicates "OFF" which represents that the movement of the job application is not performed (when the movement of the job application is performed, "ON" is indicated and the specified value is "OFF"). A usual job application execution computer number 254 indicates the identification information of the optimum computer for executing the job application having the usual CPU usage priority. The usual job application execution computer number 254 indicates "2" which is the identification number of the other computer 13. A priority job application execution computer number 255 indicates the identification information of the optimum computer for executing the job application having the high CPU usage priority. The priority job application execution computer number 255 indicates "1" which is the identification number of the main computer 1.

Figure 23:
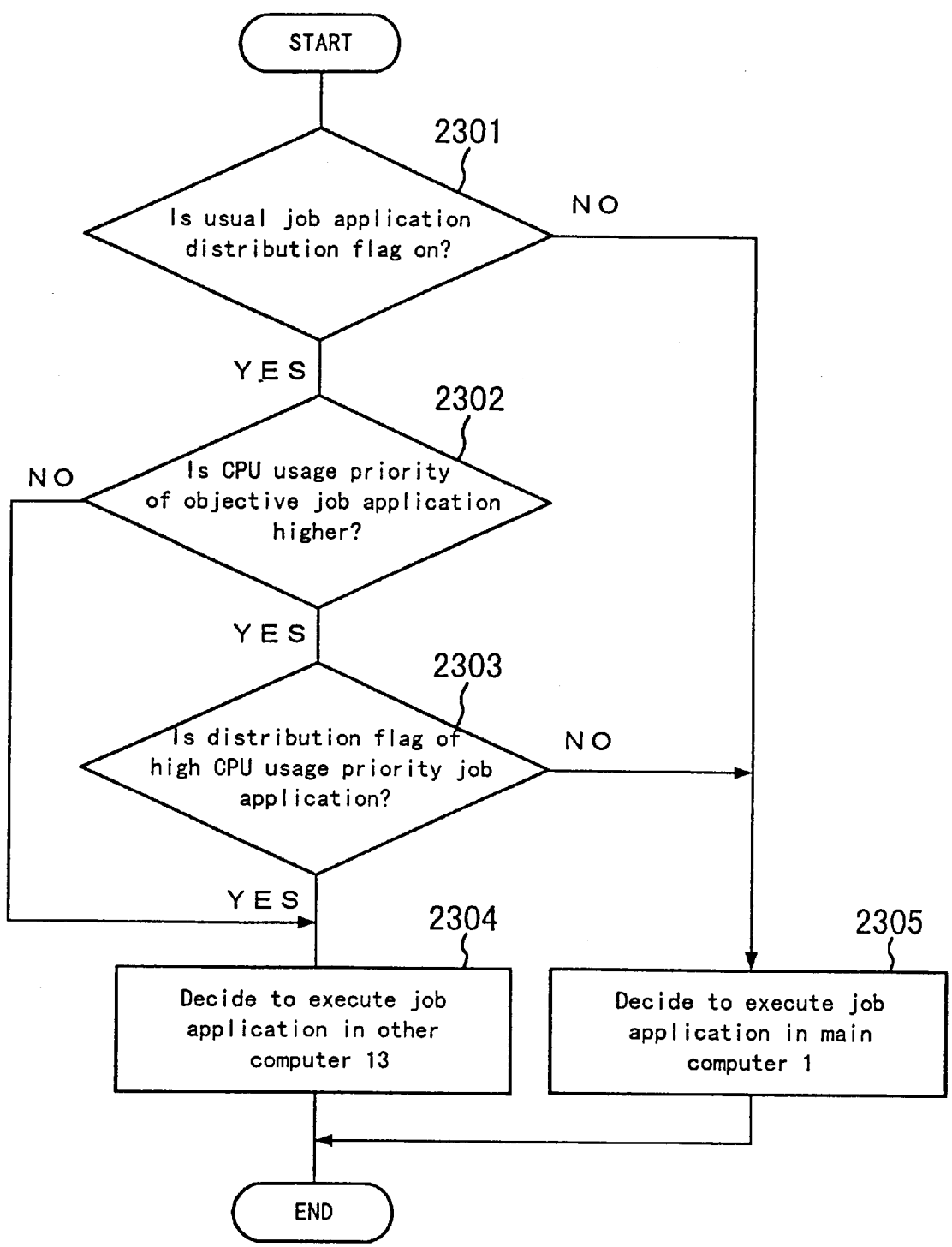
FIG. 23 is a flow chart showing the processing flow of the job application distribution which performs a by-CPU-usage-priority monitoring of the objective computer deciding means 11 according to the sixth embodiment of the present invention.

FIG. 23 is a flow chart showing the processing flow of the job application distribution which performs a by-CPU-usage-priority monitoring of the objective computer deciding means 11 according to the sixth embodiment of the present invention.

Referring to FIGS. 1 and 23, the objective computer deciding means 11 judges whether or not the usual job application distribution execution flag 252 is ON with reference to the computer information table 10 (step 2301). When the flag 252 is OFF, the objective computer deciding means 11 decides to execute the job application having the usual CPU usage priority in the main computer 1 (step 2305). When the usual job application distribution execution flag 252 is ON, the objective computer deciding means 11 decides to execute the job application having the usual CPU usage priority in the other computer 13 through a step 2302 (step 2304). Furthermore, when the CPU usage priority of the objective job application is high (step 2302), it is judged whether or not the priority job application distribution execution flag 253 is ON (step 2303). When the flag is OFF, it is decided that the objective job application is executed in the main computer 1 (step 2305). When the flag is ON, it is decided that the objective job application is executed in the other computer 13 (step 2304).

When two or more other computers 13 are present, the above processing is repeated to each computer, it is decided that the job application is moved to the computer having the largest allowance of the load.

As described above, the operation of the sixth embodiment of the present invention is completed.

In the sixth embodiment of the present invention, the CPU usage rate is calculated for every CPU usage rate priority. It is decided whether or not the movement of the job application is performed. When the CPU usage rate of the entire job application in the main computer exceeds the threshold, if the CPU usage rate of the high CPU usage priority job application does not exceed the threshold, the low CPU usage priority job application alone is moved to the other computer. In general, response characteristics of the high CPU usage priority job application are seriously taken. Accordingly, the high CPU usage priority job application is executed in the main computer so as not to be moved to the other computer. Thus, the overhead associated with a moving processing can be prevented, which results in improving the performance. Such an effect is achieved.

Next, a seventh embodiment of the present invention will be described in detail with reference to the accompanying drawings.

In the seventh embodiment of the present invention, when the CPU usage rate is collected, the main computer load information collecting means 3 of the first embodiment obtains the CPU usage rate for two or more periods. The computer specifying means 8 judges whether or not the CPU usage rate for each period exceeds a predetermined threshold. Furthermore, the objective computer deciding means 11 judges whether or not the job application having a short passing time is moved in accordance with the CPU usage rate for a short period. The objective computer deciding means 11 judges whether or not the job application having a long passing time is moved in accordance with the CPU usage rate for a long period.

Next, the operation of the seventh embodiment of the present invention will be described in detail with reference to FIGS. 1 and 26 to 30.

Figure 29:
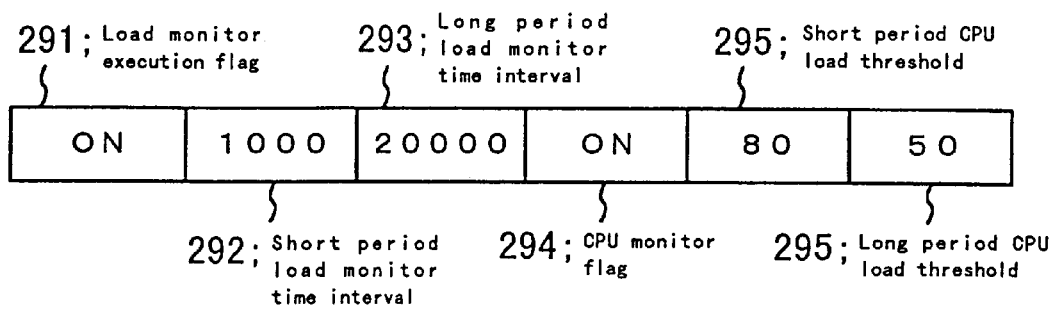
FIG. 29 shows an example of the information within the job application execution computer deciding rule table 9 according to the seventh embodiment of the present invention.

FIG. 29 shows an example of the information within the job application execution computer deciding rule table 9 which is formed by the decision rule register means 12.

Referring to FIG. 29, a load monitor execution flag 291 indicates whether or not the load monitoring is performed. The load monitor execution flag 291 indicates "ON" which represents that the monitoring is performed (when the monitoring is not performed, "OFF" is indicated and the specified value is "OFF"). A short period load monitor time interval 292 is the time interval for performing the load monitoring when the load monitoring is performed, and it indicates the time interval when the monitoring is performed for the short period. The short period load monitor time interval 292 indicates "1,000 msec". A long period load monitor time interval 293 indicates the time interval when the monitoring is performed for the long period. The long period load monitor time interval 293 indicates "2,000 msec". A CPU monitor flag 294 indicates whether or not the CPU usage state is monitored. The CPU monitor flag 294 indicates "ON" which represents that the monitoring is carried out (when the monitoring is not performed, "OFF" is indicated and the specified value is "OFF"). A short period CPU load threshold 295 indicates the threshold of the CPU usage rate for the short period as the criterion for performing the distribution. The short period CPU load threshold 295 indicates "80%". A long period CPU load threshold 296 indicates the threshold of the CPU usage rate for the long period as the criterion for performing the distribution. The long period CPU load threshold 296 indicates "50%".

In the seventh embodiment, the detailed description is made when the CPU is monitored. However, the monitor time interval having a different period of another load monitor item may be similarly set so as to perform the control.

Figure 26:
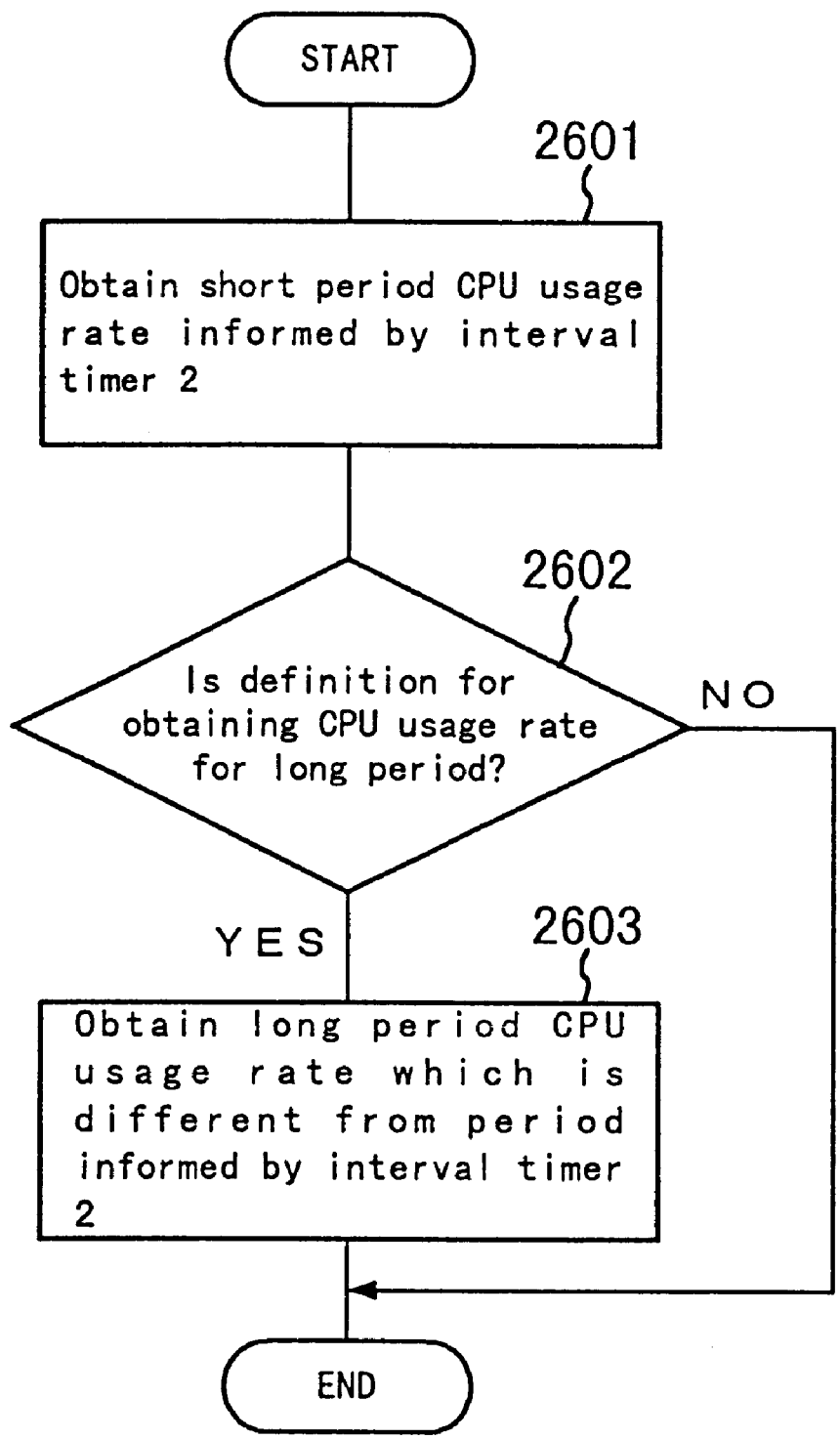
FIG. 26 is a flow chart showing the processing flow of a CPU load monitoring for a different period of the main computer load information collecting means 3 according to a seventh embodiment of the present invention.

FIG. 26 is a flow chart showing the processing flow of the CPU load monitoring for a different period of the main computer load information collecting means 3 according to the seventh embodiment of the present invention.

Referring to FIGS. 1 and 26, when the main computer load information collecting means 3 is informed from the interval timer 2, the main computer load information collecting means 3 obtains the short period CPU usage rate if the CPU monitor flag 294 is "ON" (step 2601). Next, the main computer load information collecting means 3 judges whether there is a definition of the long period CPU usage rate or not (step 2602). When the definition of the long period CPU usage rate is present, the long period CPU usage rate is obtained (step 2603). When the definition is not present, the processing is completed as it is.

Figure 30:
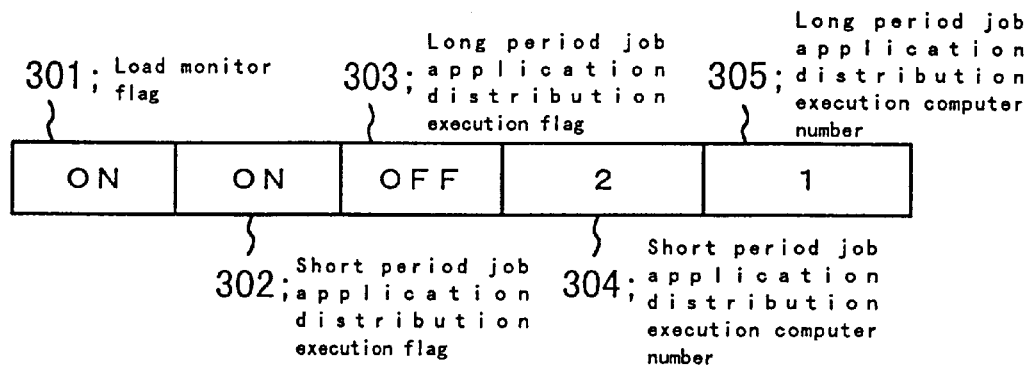
FIG. 30 shows an example of the information within the computer information table 10 according to the seventh embodiment of the present invention.

FIG. 30 shows an example of the information within the computer information table 10 which is formed by the computer specifying means 8.

Referring to FIG. 30, a load monitor flag 301 indicates whether or not the load monitoring is performed. The load monitor flag 301 indicates "ON" which represents that the monitoring is performed (when the monitoring is not performed, "OFF" is indicated and the specified value is "OFF"). A short period job application distribution execution flag 302 indicates that the job application having the short passing time is moved to the other computer 13. The short period job application distribution execution flag 302 indicates "ON" which is indicative of the movement (when the movement is not performed, "OFF" is indicated and the specified value is "OFF"). A long period job application distribution execution flag 303 indicates that the job application having the long passing time is moved to the other computer 13. The long period job application distribution execution flag 303 indicates "OFF" which represents that the movement is not performed (when the movement is performed, "ON" is indicated and the specified value is "OFF"). When the job application having the short passing time is moved, a short period job application execution computer number 304 indicates which computer the job application is executed in. The short period job application execution computer number 304 indicates "2" which is the identification number of the other computer 13. When the job application having the long passing time is moved, a long period job application execution computer number 305 indicates which computer the job application is executed in. The long period job application execution computer number 305 indicates "1" which is the identification number of the main computer 1.

Figure 27:
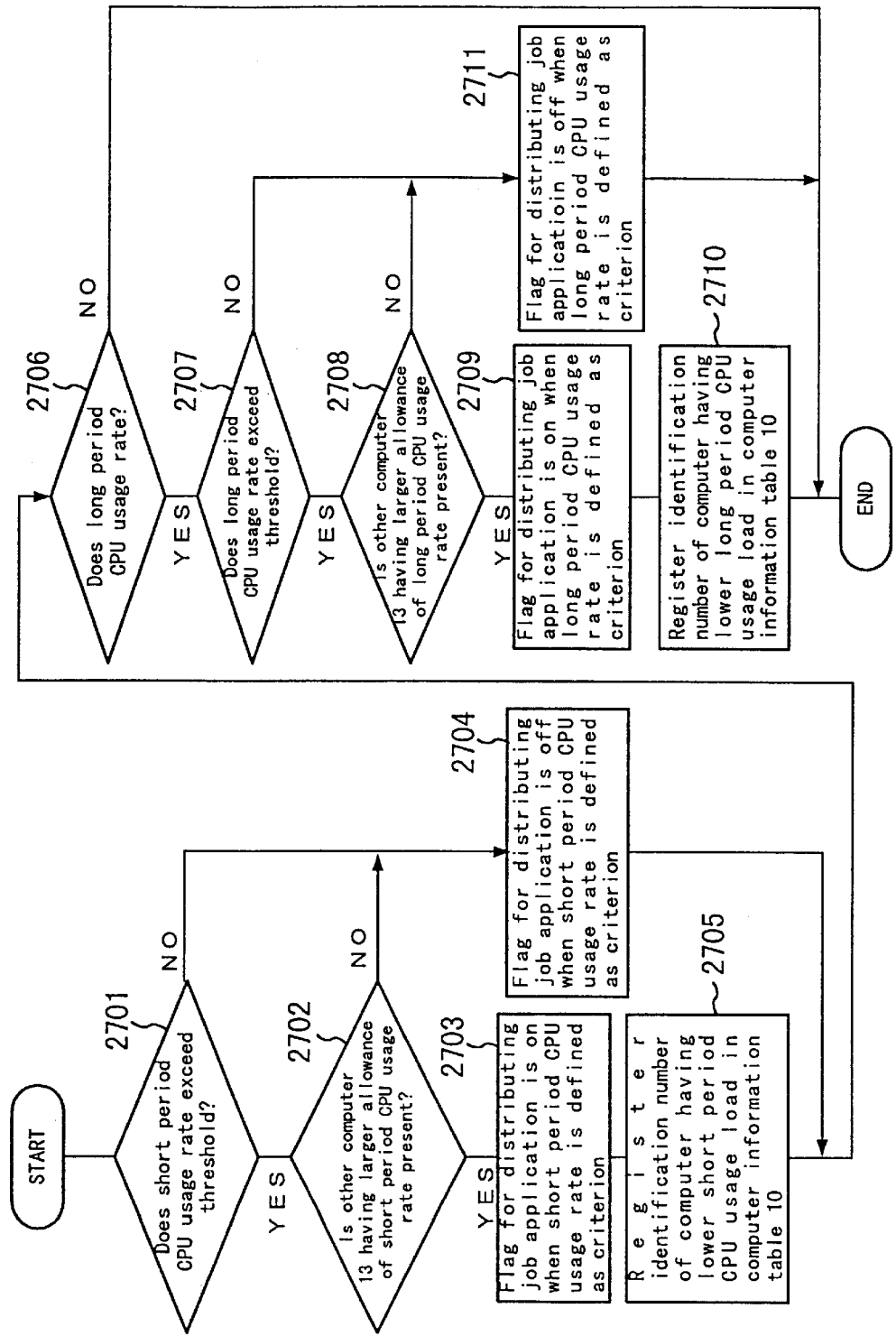
FIG. 27 is a flow chart showing the processing flow of the job application distribution when the CPU load monitoring is performed for the different period of the computer specifying means 8 according to the seventh embodiment of the present invention.

FIG. 27 is a flow chart showing the processing flow of the job application distribution when the CPU load monitoring is performed for the different period of the computer specifying means 8 according to the seventh embodiment of the present invention.

Referring to FIGS. 1 and 27, in order to form the computer information table 10 shown in FIG. 30, the computer specifying means 8 judges whether or not the short period CPU usage rate of the main computer 1 exceeds the threshold of the short period CPU usage rate (step 2701). When the short period CPU usage rate does not exceed the threshold, the short period job application distribution execution flag 302 is OFF so as not to move the job application having the short passing time to the other computer 13 (step 2704). On the contrary, when the short period CPU usage rate exceeds the threshold, the computer specifying means 8 judges whether or not the short period CPU usage rate of the other computer 13 is lower than that of the main computer 1 and the other computer 13 has the allowance (step 2702). In the absence of the other computer 13 having the allowance, the short period job application distribution execution flag 302 is OFF so as not to move the job application having the short passing time to the other computer 13 (step 2704). When the other computer 13 having the allowance of the CPU is present, the short period job application distribution execution flag 302 is ON so as to move the job application having the short passing time to the other computer 13 (step 2703). Furthermore, the identification number of the computer having the low CPU load is stored in the computer information table 10 (step 2705).

Next, it is judged whether or not the long period CPU usage rate is obtained (step 2706). When the long period CPU usage rate is not obtained, the processing is completed. When the long period CPU usage rate is obtained, it is judged whether or not the long period CPU usage rate of the main computer 1 exceeds the threshold of the long period CPU usage rate (step 2707). When the long period CPU usage rate does not exceed the threshold, the long period job application distribution execution flag 303 is "OFF" so as not to move the job application having the long passing time to the other computer 13 (step 2711). On the contrary, when the long period CPU usage rate exceeds the threshold, it is judged whether or not the long period CPU usage rate of the other computer 13 is lower than that of the main computer 1 and the other computer 13 has the allowance of the CPU (step 2708). In the absence of the other computer 13 having the allowance, the long period job application distribution execution flag 303 is "OFF" so as not to move the job application having the long passing time to the other computer 13 (step 2711). When the computer having the allowance of the CPU is present, the long period job application distribution execution flag 303 is "ON" so as to move the job application having the long passing time to the other computer 13 (step 2709). In addition, the identification number of the computer having the low CPU load is stored in the computer information table 10 (step 2710).

Figure 28:
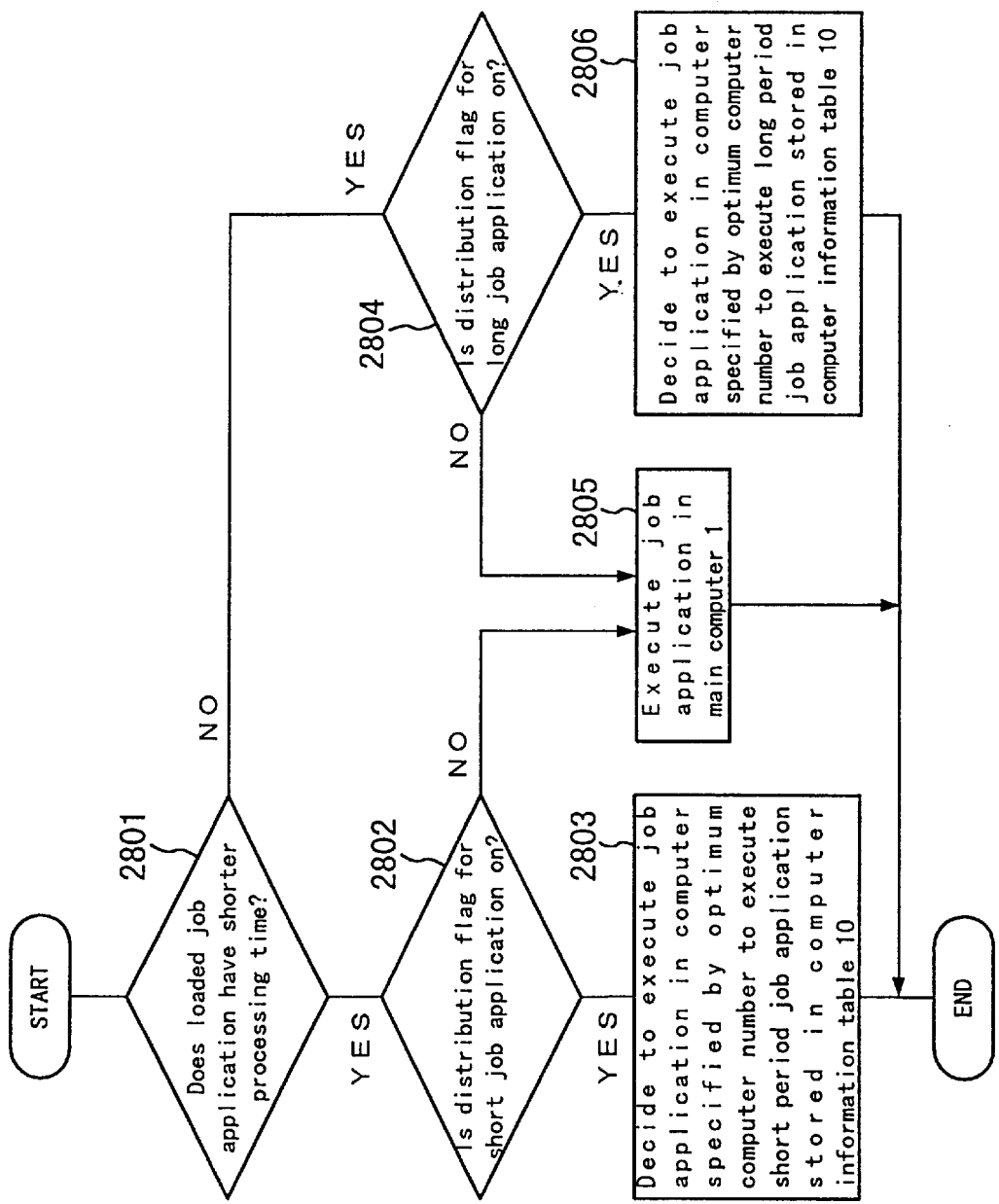
FIG. 28 is a flow chart showing the processing flow of the job application distribution when the CPU load monitoring is performed for the different period of the objective computer deciding means 11 according to the seventh embodiment of the present invention.

FIG. 28 is a flow chart showing the processing flow of the job application distribution when the CPU load monitoring is performed for the different period of the objective computer deciding means 11 according to the seventh embodiment of the present invention.

Referring to FIGS. 1 and 28, the objective computer deciding means 11 performs the following processing for the job application prior to scheduling which is loaded to the main computer 1 with reference to the computer information table 10 which is formed in such a manner.

In the first place, it is judged whether the passing time of the loaded job application is short or long (step 2801). When the passing time is short, it is judged whether or not the short period job application distribution execution flag 302 is ON (step 2802). When the short period job application distribution execution flag 302 is ON, it is decided to move the job application to the computer which is specified by the short period job application execution computer number 304 stored in the computer information table 10 (step 2803). When the short period job application distribution execution flag 302 is OFF, it is decided to execute the job application in the main computer 1 without the movement of the job application (step 2805).

On the other hand, when the passing time of the loaded job application is long, it is judged whether or not the long period job application distribution execution flag 303 is ON (step 2804). When the long period job application distribution execution flag 303 is ON, it is decided to move the job application to the computer which is specified by the long period job application execution computer number 305 stored in the computer information table 10 (step 2806). When the long period job application distribution execution flag 303 is OFF, it is decided to execute the job application in the main computer 1 without the movement of the job application (step 2805).

In the seventh embodiment, two measurement periods are set when the CPU is monitored. However, even if the load monitor item is any other item than the CPU, or even if three or more measurement periods are present, the above processing is only performed. The basic processing is the same as described above.

Furthermore, when two or more other computers 13 are present, the above processing is repeated to each computer. It is decided to move the job application to the computer having the largest allowance of the load.

As described above, the operation of the seventh embodiment of the present invention is completed.

In the seventh embodiment of the present invention, when the load is monitored, two or more measurement periods are set. Short period monitor data is used for the job application having the short passing time. Long period monitor data is used for the job application having the long passing time. Whether or not the job application having the long passing period is moved is judged in accordance with the short period monitor data. At this time, because of the temporary high load state of the job application, the inappropriate job application distribution might be performed. Namely, although the job application has the load which is not very so high if the load is averaged, it is decided to move the job application to the other computer. However, a construction such as the embodiment allows the inappropriate job application distribution to be prevented. Such an effect is achieved.

Next, an eighth embodiment of the present invention will be described in detail with reference to the accompanying drawings.

Referring to FIG. 1, in the eighth embodiment of the present invention, in addition to the first embodiment, the main computer 1 and the other computer 13 are provided with recording media 14 which records the program for the execution of the processing according to the first embodiment to the seventh embodiment described above. The program is read from the recording media 14 into the main computer 1 and the other computer 13. The program controls the operation of the main computer 1 and the other computer 13. The main computer 1 and the other computer 13 are controlled by the program so as to execute the processing by the main computer 1 and the other computer 13 in the first to seventh embodiments, that is, the same processing as the main computer load information collecting means 3, the main computer load information storage means 4, the other computer load information reference means 6, the computer specifying means 8, the objective computer deciding means 11 and the decision rule register means 12.

In such a manner, the processing of the eighth embodiment is completed.

As described above, according to the present invention, the load is leveled among a plurality of computers. Accordingly, the effect is achieved that the job application can be efficiently executed.

Furthermore, the load information of each computer is stored in a common file, which allows each computer to mutually monitor the load information. Accordingly, even if the job application is moved among the computers, the effect is achieved that the overhead associated with the movement does not deteriorate the performance of a computer system.

Although the invention has been described in detail above in connection with various preferred embodiments thereof, it will be appreciated by those skilled in the art that these embodiments have been provided solely for purpose of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A job application distributing system among a plurality of computers sharing an external storage device, at least one of said plurality of computers comprising:

load information collecting means for collecting the usage rate of a first particular source in said at least one computer at predetermined intervals;

load information storage means for storing, in said external storage device, the usage rate of said first particular source in said computer collected by said load information collecting means;

load information reference means for fetching the usage rates of second particular sources in the other computers from said external storage device, these second particular sources being of the same kind as said first particular source in said computer;

computer specifying means for judging whether or not the usage rate of said first particular source in said computer exceeds a preset threshold, deciding that said computer should execute a job application if the usage rate of said first particular source in said computer does not exceed said preset threshold, and deciding that one of the other computers should execute said job application if the usage rate of said first particular source in said computer exceeds said preset theshold and if the usage rate of said second particular source in said one of the other computers is lower than the usage rate of said first particular source in said computer; and job processing means for, when said job application is loaded into said computer, executing said job application if the computer decided by said computer specifying means is said computer and sending said job application to said one of the other computers decided by computer specifying means if the computer decided by computer specifying means is said one of the other computers.

2. The job application distributing system among a plurality of computers according to claim 1, wherein said computer specifying means judges whether or not the usage rate of said first particular source in said computer exceeds a preset threshold, decides that said computer should execute a job application if the usage rate of said first particular source in said computer does not exceed said preset threshold, and decides that one of the other computers should execute said job application if the usage rate of said first particular source in said computer exceeds said preset threshold and if the usage rate of said second particular source in said one of the other computers is lower than the usage rate of said first particular source in said computer by more than a preset value.

3. The job application distributing system among a plurality of computers according to claim 1, wherein said computer specifying means judges whether or not the usage rate of said first particular source in said computer exceeds a preset threshold, sets the maximum to a job application processing rate which is a rate of the job application executed in said computer if the usage rate of said first particular source in said computer does not exceed said preset threshold, decreases said job application processing rate if the usage rate of said first particular source in said computer exceeds said preset threshold and if the usage rate of said second particular source in one of the other computers is lower than the usage rate of said first particular source in said computer, and increases said job application processing rate if the usage rate of said first particular source in said computer exceeds said preset threshold and if the usage rate of said second particular source in said one of the other computers is higher than the usage rate of said first particular source in said computer; and said job processing means, when said job application is loaded into said computer, executes the corresponding number of the job application to said job application processing rate and sends the remaining job application to said one of the other computers.

4. The job application distributing system among a plurality of computers according to claim 1, wherein said load information collecting means collects the CPU usage rate in said at least one computer at predetermined intervals; and said load information storage means stores, in said external storage device, said CPU usage rate in said computer collected by said load information collecting means; and said load information reference means fetches said CPU usage rate in the other computers from said external storage device; and said computer specifying means judges whether or not said CPU usage rate in said computer exceeds a preset threshold, decides that said computer should execute a job application if said CPU usage rate in said computer does not exceed said preset threshold, multiplies a CPU idle time by a CPU performance value in each of said plurality of computers and decides that the computer having the largest multiplied value should execute said job application if said CPU usage rate in said computer exceeds said preset threshold.

5. The job application distributing system among a plurality of computers according to claim 1, wherein said load information collecting means collects the usage rate of a first particular source and the usage rate of a second particular source in said at least one computer at predetermined intervals; and said load information storage means stores, in said external storage device, the usage rate of said first particular source and the usage rate of said second particular source in said computer collected by said load information collecting means; and said load information reference means fetches the usage rates of third particular sources and the usage rates of fourth particular sources in the other computers from said external storage device, these third particular sources and these fourth particular sources being of the same kind as said first particular source and said second particular source in said computer; and said computer specifying means judges whether or not the usage rate of said first particular source in said computer exceeds a preset threshold, decides said that computer should execute a job application if the usage rate of said first particular source in said computer does not exceed said preset threshold, and decides that one of the other computers should execute said job application if the usage rate of said first particular source in said computer exceeds said preset threshold and if the usage rates of said third particular source in said other computers are higher than the usage rate of said first particular source in said computer and if the usage rate of said fourth particular source in said one of the other computers is lower than the usage rate of said second particular source in said computer.

6. The job application distributing system among a plurality of computers according to claim 1, wherein said load information collecting means collects a CPU usage rate of the entire job application and a CPU usage rate of the high priority job application in said at least one computer at predetermined intervals; and said load information storage means stores, in said external storage device, the CPU usage rate of said entire job application and the CPU usage rate of said high priority job application in said computer collected by said load information collecting means; and said load information reference means fetches the CPU usage rate of the entire job application and the CPU usage rates of said high priority job application in the other computers from said external storage device; and said computer specifying means judges whether or not the CPU usage rate of said entire job application in said computer exceeds a preset threshold, decides that said computer should execute said entire job application if the CPU usage rate of said entire job application in said computer does not exceed said preset threshold, judges whether or not the CPU usage rate of said high priority job application exceeds said preset threshold if the CPU usage rate of said entire job application exceeds said preset threshold, decides that said computer should execute said high priority job application and said the other computers should execute any other job application than said high priority job application if the CPU usage rate of said high priority job application does not exceed said preset threshold, and decides that said the other computers should execute the entire job application if the CPU usage rate of said high priority job application exceeds said preset threshold.

7. The job application distributing system among a plurality of computers according to claim 1, wherein said load information collecting means collects the averaged usage rate of a first particular source for a plurality of periods in said at least one computer at predetermined intervals, each period having a different length; and said load information storage means stores, in said external storage device, the averaged usage rate of said first particular source for a plurality of periods in said computer collected by said load information collecting means; and said load information reference means fetches the averaged usage rates of said second particular sources for a plurality of periods in the other computers from said external storage device, these second particular sources being of the same kind as said first particular source in said computer; and said computer specifying means judges whether or not the averaged usage rate of said first particular source for the short period in said computer exceeds a preset threshold, decides that said computer should execute a short passing time job application if the averaged usage rate of said first particular source for the short period in said computer does not exceed said preset threshold, decides that one of the other computers should execute said short passing time job application if the averaged usage rate of said first particular source for the short period in said computer exceeds said preset threshold and if the averaged usage rate of said second particular source for the short period in said one of the other computer is lower than the averaged usage rate of said first particular source for the short period in said computer, said computer specifying means judges whether or not the averaged usage rate of said first particular source for the long period in said computer exceeds a preset threshold, decides that said computer should execute a long passing time job application if the averaged usage rate of said first particular source for the long period in said computer does not exceed said preset threshold, decides that one of the other computers should execute said long passing time job application if the averaged usage rate of said first particular source for the long period in said computer exceeds said preset threshold and if the averaged usage rate of said second particular source for the long period in said one of the other computer is lower than the averaged usage rate of said first particular source for the long period in said computer.

8. A method of distributing a job application among a plurality of computers comprising the steps of:

collecting the usage rate of a first particular source in said at least one computer at predetermined intervals;

storing, in said external storage device, the usage rate of said first particular source in said computer collected in said collecting step;

fetching the usage rates of second particular sources in the other computers from said external storage device, these second particular sources being of the same kind as said first particular source in said computer;

judging whether or not the usage rate of said first particular source in said computer exceeds a preset threshold, deciding that said computer should execute a job application if the usage rate of said first particular source in said computer does not exceed said preset threshold, and deciding that one of the other computers should execute said job application if the usage rate of said first particular source in said computer exceeds said preset threshold and if the usage rate of said second particular source in said one of the other computers is lower than the usage rate of said first particular source in said computer; and when said job application is loaded into said computer, executing said job application if the computer decided in said judging step is said computer and sending said job application to said one of the other computers decided in said judging step if the computer decided in said judging step is said one of the other computers.

9. The method of distributing a job application among a plurality of computers according to claim 8, wherein said judging step further judges whether or not the usage rate of said first particular source in said computer exceeds a preset threshold, decides that said computer should execute a job application if the usage rate of said first particular source in said computer does not exceed said preset threshold, and decides that one of the other computers should execute said job application if the usage rate of said first particular source in said computer exceeds said preset threshold and if the usage rate of said second particular source in said one of the other computers is lower than the usage rate of said first particular source in said computer by more than a preset value.

10. The method of distributing a job application among a plurality of computers according to claim 8, wherein said judging step further judges whether or not the usage rate of said first particular source in said computer exceeds a preset threshold, sets the maximum to a job application processing rate which is a rate of the job application executed in said computer if the usage rate of said first particular source in said computer does not exceed said preset threshold, decreases said job application processing rate if the usage rate of said first particular source in said computer exceeds said preset threshold and if the usage rate of said second particular source in one of the other computers is lower than the usage rate of said first particular source in said computer, and increases said job application processing rate if the usage rate of said first particular source in said computer exceeds said preset threshold and if the usage rate of said second particular source in said one of the other computers is higher than the usage rate of said first particular source in said computer; and said executing step, when said job application is loaded into said computer, executes the corresponding number of the job application to said job application processing rate and sends the remaining job application to said one of the other computers.

11. The method of distributing a job application among a plurality of computers according to claim 8, wherein said collecting step further collects the CPU usage rate in said at least one computer at predetermined intervals; and said storing step further stores, in said external storage device, said CPU usage rate in said computer collected in said collecting step; and said fetching step further fetches said CPU usage rate in the other computers from said external storage device; and said judging step further judges whether or not said CPU usage rate in said computer exceeds a preset threshold, decides that said computer should execute a job application if said CPU usage rate in said computer does not exceed said preset threshold, multiplies a CPU idle time by a CPU performance value in each of said plurality of computers and decides that the computer having the largest multiplied value should execute said job application if said CPU usage rate in said computer exceeds said preset threshold.

12. The method of distributing a job application among a plurality of computers according to claim 8, wherein said collecting step further collects the usage rate of a first particular source and the usage rate of a second particular source in said at least one computer at predetermined intervals; and said storing step further stores, in said external storage device, the usage rate of said first particular source and the usage rate of said second particular source in said computer collected in said collecting step; and said fetching step further fetches the usage rates of third particular sources and the usage rates of fourth particular sources in the other computers from said external storage device, these third particular sources and these fourth particular sources being of the same kind as said first particular source and said second particular source in said computer; and said judging step further judges whether or not the usage rate of said first particular source in said computer exceeds a preset threshold, decides said that computer should execute a job application if the usage rate of said first particular source in said computer does not exceed said preset threshold, and decides that one of the other computers should execute said job application if the usage rate of said first particular source in said computer exceeds said preset threshold and if the usage rates of said third particular source in said other computers are higher than the usage rate of said first particular source in said computer and if the usage rate of said fourth particular source in said one of the other computers is lower than the usage rate of said second particular source in said computer.

13. The method of distributing a job application among a plurality of computers according to claim 8, wherein said collecting step further collects a CPU usage rate of the entire job application and a CPU usage rate of the high priority job application in said at least one computer at predetermined intervals; and said storing step further stores, in said external storage device, the CPU usage rate of said entire job application and the CPU usage rate of said high priority job application in said computer collected in said load collecting step; and said fetching step further fetches the CPU usage rate of the entire job application and the CPU usage rates of said high priority job application in the other computers from said external storage device; and said judging step further judges whether or not the CPU usage rage of said entire job application in said computer exceeds a preset threshold, decides that said computer should execute said entire job application if the CPU usage rate of said entire job application in said computer does not exceed said preset threshold, judges whether or not the CPU usage rate of said high priority job application exceeds said preset threshold if the CPU usage rate of said entire job application exceeds said preset threshold, decides that said computer should execute said high priority job application and said the other computers should execute any other job application than said high priority job application if the CPU usage rate of said high priority job application does not exceed said preset threshold, and decides that said the other computers should execute the entire job application if the CPU usage rate of said high priority job application exceeds said preset threshold.

14. The method of distributing a job application among a plurality of computers according to claim 8, wherein said collecting step further collects the averaged usage rate of a first particular source for a plurality of periods in said at least one computer at predetermined intervals, each period having a different length; and said storing step further stores, in said external storage device, the averaged usage rate of said first particular source for a plurality of periods in said computer collected in said collecting step; and said fetching step further fetches the averaged usage rates of said second particular sources for a plurality of periods in the other computers from said external storage device, these second particular sources being of the same kind as said first particular source in said computer; and said judging step further judges whether or not the averaged usage rate of said first particular source for the short period in said computer exceeds a preset threshold, decides that said computer should execute a short passing time job application if the averaged usage rate of said first particular source for the short period in said computer does not exceed said preset threshold, decides that one of the other computers should execute said short passing time job application if the averaged usage rate of said first particular source for the short period in said computer exceeds said preset threshold and if the averaged usage rate of said second particular source for the short period in said one of the other computer is lower than the averaged usage rate of said first particular source for the short period in said computer, judges whether or not the averaged usage rate of said first particular source for the long period in said computer exceeds a preset threshold, decides that said computer should execute a long passing time job application if the averaged usage rate of said first particular source for the long period in said computer does not exceed said preset threshold, decides that one of the other computers should execute said long passing time job application if the averaged usage rate of said first particular source for the long period in said computer exceeds said preset threshold and if the averaged usage rate of said second particular source for the long period in said one of the other computer is lower than the averaged usage rate of said first particular source for the long period in said computer.

15. Recording media for recording a program which allows each of a plurality of computers sharing an external storage device to perform processing, said processing comprising:

a load information collecting processing for collecting the usage rate of a first particular source in said at least one computer at predetermined intervals;

a load information storage processing for storing, in said external storage device, the usage rate of said first particular source in said computer collected by said load information collecting processing, a load information reference processing for fetching the usage rates of second particular sources in the other computers from said external storage device, these second particular sources being of the same kind as said first particular source in said computer;

a computer specifying processing for judging whether or not the usage rate of said first particular source in said computer exceeds a preset threshold, deciding that said computer should execute a job application if the usage rate of said first particular source in said computer does not exceed said preset threshold, and deciding that one of the other computers should execute said job application if the usage rate of said first particular source in said computer exceeds said preset threshold and if the usage rate of said second particular source in said one of the other computers is lower than the usage rate of said first particular source in said computer; and a job processing for, when said job application is loaded into said computer, executing said job application if the computer decided by said computer specifying processing is said computer and sending said job application to said one of the other computers decided by computer specifying processing if the computer decided by computer specifying processing is said one of the other computers.

16. The recording media according to claim 15, wherein said computer specifying processing further judges whether or not the usage rate of said first particular source in said computer exceeds a preset threshold, decides that said computer should execute a job application if the usage rate of said first particular source in said computer does not exceed said preset threshold, and decides that one of the other computers should execute said job application if the usage rate of said first particular source in said computer exceeds said preset threshold and if the usage rate of said second particular source in said one of the other computers is lower than the usage rate of said first particular source in said computer by more than a preset value.

17. The recording media according to claim 15, wherein said computer specifying processing further judges whether or not the usage rate of said first particular source in said computer exceeds a preset threshold, sets the maximum to a job application processing rate which is a rate of the job application executed in said computer if the usage rate of said first particular source in said computer does not exceed said preset threshold, decreases said job application processing rate if the usage rate of said fist particular source in said computer exceeds said preset threshold and if the usage rate of said second particular source in one of the other computers is lower than the usage rate of said first particular source in said computer, and increases said job application processing rate if the usage rate of said first particular source in said computer exceeds said preset threshold and if the usage rate of said second particular source in said one of the other computers is higher than the usage rate of said first particular source in said computer; and said job processing, when said job application is loaded into said computer, further executes the corresponding number of the job application to said job application processing rate and sends the remaining job application to said one of the other computers.

18. The recording media according to claim 15, wherein said load information collecting processing further collects the CPU usage rate in said at least one computer at predetermined intervals; and said load information storage processing further stores, in said external storage device, said CPU usage rate in said computer collected by said load information collecting processing; and said load information reference processing further fetches said CPU usage rate in the other computers from said external storage device; and said computer specifying processing further judges whether nor not said CPU usage rate in said computer exceeds a preset threshold, decides that said computer should execute a job application if said CPU usage rate in said computer does not exceed said preset threshold, multiplies a CPU idle time by a CPU performance value in each of said plurality of computers and decides that the computer having the largest multiplied value should execute said job application if said CPU usage rate in said computer exceeds said preset threshold.

19. The recording media according to claim 15, wherein said load information collecting processing further collects the usage rate of a first particular source and the usage rate of a second particular source in said at least one computer at predetermined intervals; and said load information storage processing further stores, in said external storage device, the usage rate of said first particular source and the usage rate of said second particular source in said computer collected by said load information collecting processing; and said load information reference processing further fetches the usage rates of third particular sources and the usage rates of fourth particular sources in the other computers from said external storage device, these third particular sources and these fourth particular sources being of the same kind as said first particular source and said second particular source in said computer; and said computer specifying processing further judges whether or not the usage rate of said first particular source in said computer exceeds a preset threshold, decides said that computer should execute a job application if the usage rate of said first particular source in said computer does not exceed said preset threshold, and decides that one of the other computers should execute said job application if the usage rate of said first particular source in said computer exceeds said preset threshold and if the usage rates of said third particular source in said other computers are higher than the usage rate of said first particular source in said computer and if the usage rate of said fourth particular source in said one of the other computers is lower than the usage rate of said second particular source in said computer.

20. The recording media according to claim 15, wherein
said load information collecting processing further collects a CPU usage rate of the entire job application and a CPU usage rate of the high priority job application in said at least one computer at predetermined intervals; and said load information storage processing further stores, in said external storage device, the CPU usage rate of said entire job application and the CPU usage rate of said high priority job application in said computer collected by said load information collecting processing; and said load information reference processing further fetches the CPU usage rate of the entire job application and the CPU usage rates of said high priority job application in the other computers from said external storage device; and said computer specifying processing further judges whether or not the CPU usage rate of said entire job application in said computer exceeds a preset threshold, decides that said computer should execute said entire job application if the CPU usage rate of said entire job application in said computer does not exceed said preset threshold, judges whether or not the CPU usage rate of said high priority job application exceeds said preset threshold if the CPU usage rate of said entire job application exceeds said present threshold, decides that said computer should execute said high priority job application and said the other computers should execute any other job application than said high priority job application if the CPU usage rate of said high priority job application does not exceed said preset threshold, and decides that said the other computers should execute the entire job application if the CPU usage rate of said high priority job application exceeds said preset threshold.

21. The recording media according to claim 15, wherein
said load information collecting processing further collects the averaged usage rate of a first particular source of a plurality of periods in said at least one computer at predetermined intervals, each period having a different length; and said load information storage processing further stores, in said external storage device, the averaged usage rate of said first particular source for a plurality of periods in said computer collected by said load information collecting processing; and said load information reference processing further fetches the averaged usage rates of said second particular sources for a plurality of periods in the other computers from said external storage device, these second particular sources being of the same kind as said first particular source in said computer; and said computer specifying processing further judges whether or not the averaged usage rate of said first particular source for the short period in said computer exceeds a preset threshold, decides that said computer should execute a short passing time job application if the averaged usage rate of said first particular source for the short period in said computer does not exceed said preset threshold, decides that one of the other computers should execute said short passing time job application if the averaged usage rate of said first particular source for the short period in said computer exceeds said preset threshold and if the averaged usage rate of said second particular source for the short period in said one of the other computer is lower than the averaged usage rate of said first particular source for the short period in said computer, judges whether or not the averaged usage rate of said first particular source for the long period in said computer exceeds a preset threshold, decides that said computer should execute a long passing time job application if the averaged usage rate of said first particular source for the long period in said computer does not exceed said preset threshold, decides that one of the other computers should execute said long passing time job application if the averaged usage rate of said first particular source for the long period in said computer exceeds said preset threshold and if the averaged usage rate of said second particular source for the long period in said one of the other computer is lower than the averaged usage rate of said first particular source for the long period in said computer.

* * * * *